United States Patent [19]
Karaki et al.

[11] Patent Number: 6,129,303
[45] Date of Patent: Oct. 10, 2000

[54] METHOD OF AND APPARATUS FOR PROCESSING PHOTOSENSITIVE FILM

[75] Inventors: Hideyuki Karaki; Chiaki Suzuki, both of Minamiashigara; Yoshinobu Misumi, Odawara; Takayuki Kambara, Minamiashigara; Susumu Sato, Odawara, all of Japan

[73] Assignee: Fuji Photo Film Co., Ltd., Kanagawa-ken, Japan

[21] Appl. No.: 09/179,416

[22] Filed: Oct. 27, 1998

[30] Foreign Application Priority Data

Oct. 28, 1997 [JP] Japan ................................. 9-295701
Oct. 30, 1997 [JP] Japan ................................. 9-299158

[51] Int. Cl.$^7$ ............................ B65H 23/06; B65H 35/00
[52] U.S. Cl. ................................. 242/523.1; 242/421.1
[58] Field of Search ........................ 355/18, 29; 29/429, 29/430, 431, 806, 407.05, 434, 417, 564.6; 242/348, 348.1, 348.2, 348.3, 348.4, 526, 527, 527.1, 527.5, 527.6, 527.7, 533, 534.2, 522; 53/116, 118, 430, 520, 513, 54

[56] References Cited

U.S. PATENT DOCUMENTS

| | | | |
|---|---|---|---|
| 3,712,553 | 1/1973 | Napor et al. | 242/56 |
| 3,930,296 | 1/1976 | Hoover | 29/430 |
| 4,228,579 | 10/1980 | Dunkel et al. | 29/430 |
| 4,574,563 | 3/1986 | Shimizu | 53/430 |
| 4,770,358 | 9/1988 | Suzuki et al. | 242/527.3 |
| 5,190,233 | 3/1993 | Nelson et al. | 242/56 |
| 5,257,492 | 11/1993 | Watts | 53/430 |
| 5,479,691 | 1/1996 | Shimizu et al. | 29/430 |
| 5,606,842 | 3/1997 | Sakamoto et al. | 53/54 |
| 5,618,377 | 4/1997 | Kaneko et al. | 156/504 |
| 5,713,533 | 2/1998 | Nordlof et al. | 242/418.1 |
| 5,743,482 | 4/1998 | Suzuki et al. | 242/533.4 |

FOREIGN PATENT DOCUMENTS 0 584 583  3/1994  European Pat. Off. ........ G03B 17/26

*Primary Examiner*—Russell Adams
*Assistant Examiner*—Rodney Fuller
*Attorney, Agent, or Firm*—Sughrue, Mion, Zinn, Macpeak & Seas, PLLC

[57] ABSTRACT

An apparatus for processing an elongate photographic photosensitive film has a cutting mechanism for cutting the elongate photographic photosensitive film, first and second feed mechanisms disposed one on each side of the cutting mechanism, an inserting mechanism for inserting the leading end of the elongate photographic photosensitive film into a spool, and a cam switching mechanism for changing the timing of operation of the cutting mechanism depending on any one of predetermined lengths. The leading ends of sized films of different lengths that are cut from the elongate photographic photosensitive film can automatically be inserted into spools with a relatively simple arrangement.

15 Claims, 20 Drawing Sheets

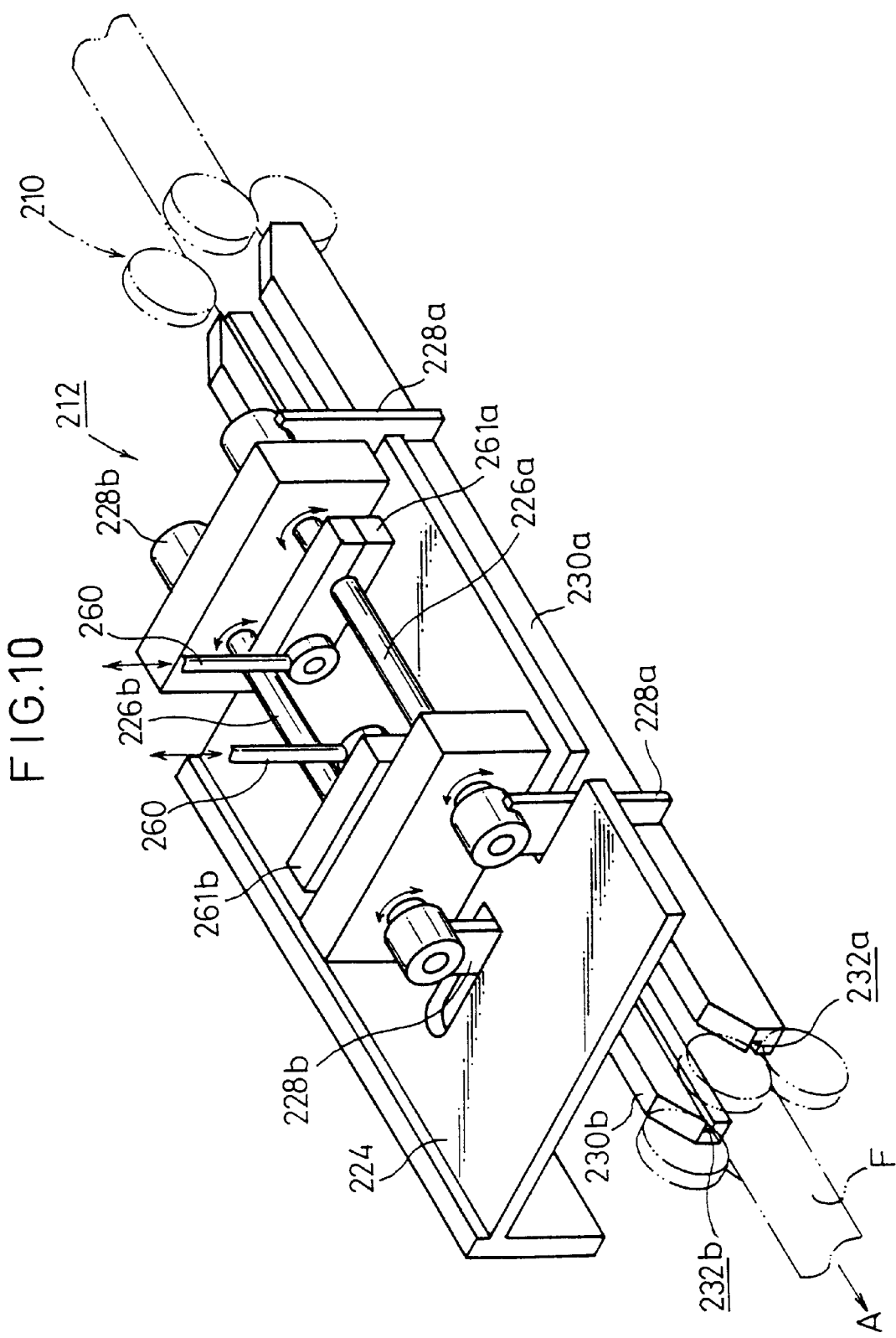

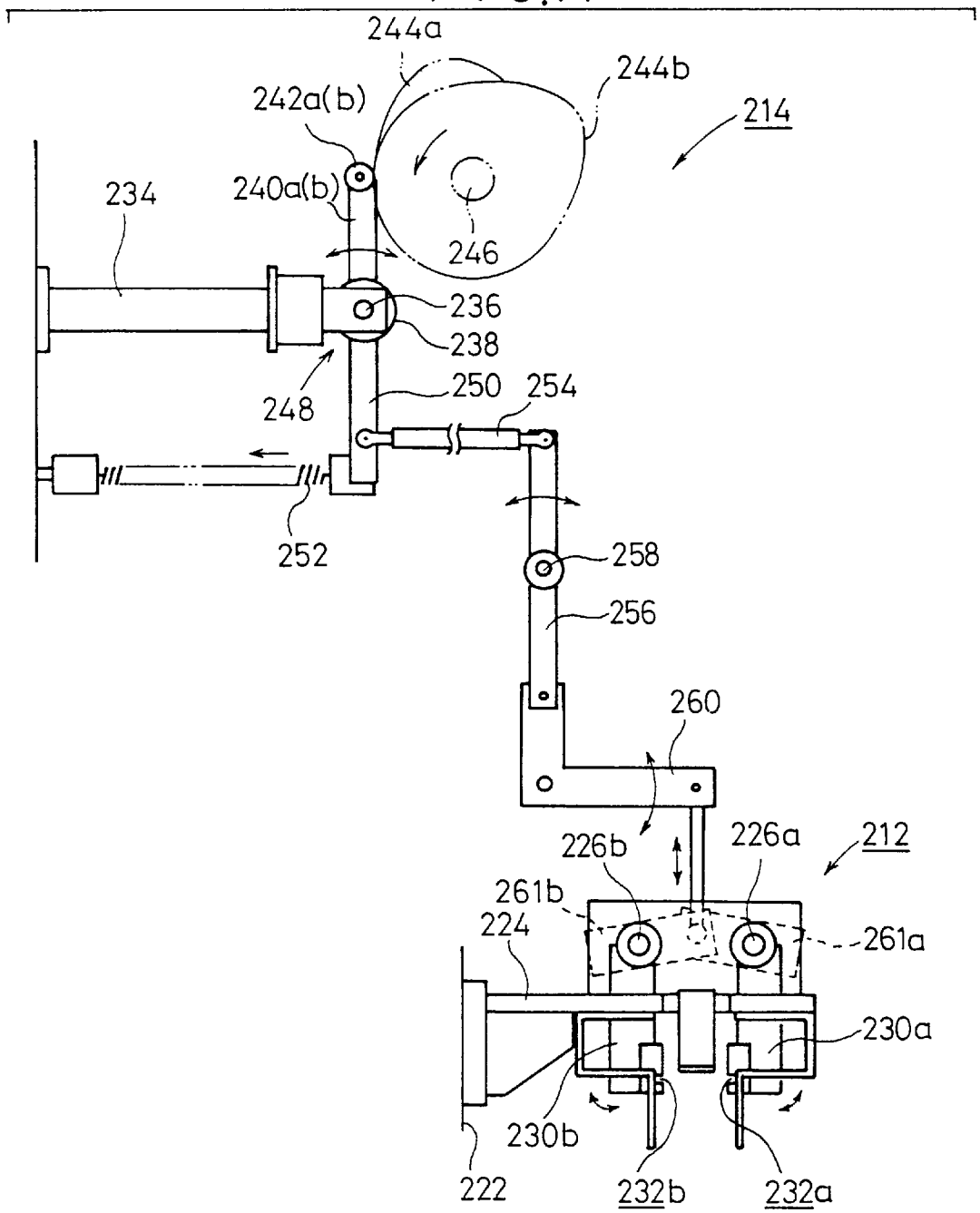
F I G. 11

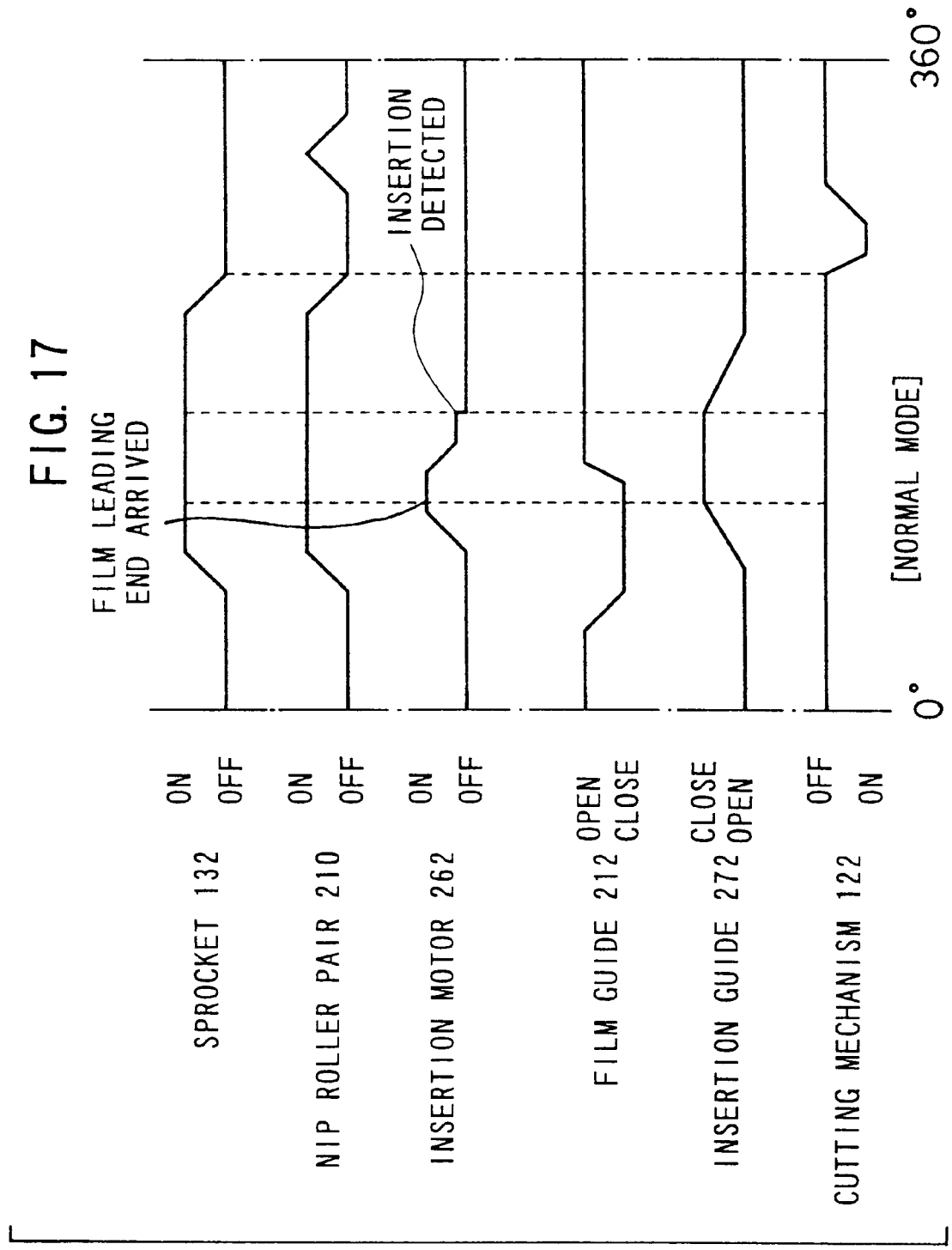

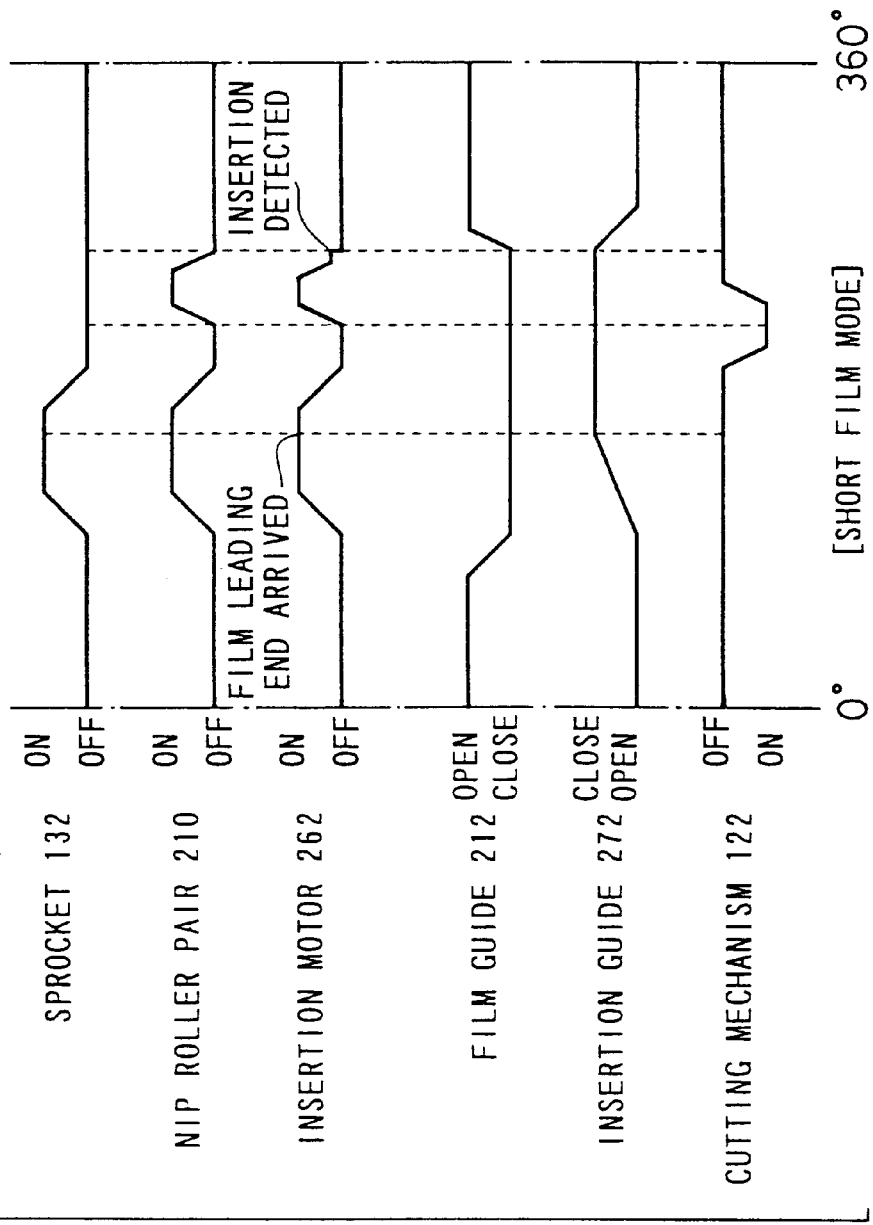

METHOD OF AND APPARATUS FOR PROCESSING PHOTOSENSITIVE FILM

BACKGROUND OF THE INVENTION

1. Field of the Invention

The present invention relates to a method and an apparatus for smoothly unreeling an elongate photographic photosensitive film and cutting the elongate photographic photosensitive film to various pre determined lengths.

2. Description of the Related Art

For producing and packaging a photographic photosensitive film, it has been customary to perform various steps including the steps of producing a film of given length, winding the film, placing the wound film into a film cartridge, and inserting the film cartridge into a case.

These various steps are carried out by a facility, i.e., a film producing and packaging system, comprising a film supply unit for unwinding a film roll and cutting, i.e., trimming, the unwound film to a film of given length, i.e., a sized film, a film coiling unit for coiling the sized film on a spool thereby to produce a film coil, a cartridge producing unit for staking a cap on an end of a tubular cartridge blank sheet thereby to produce a cartridge with one open end, an assembling unit for inserting the film coil into the cartridge and staking another cap on the open end of the cartridge thereby to produce an assembled cartridge, and an encasing unit for placing the assembled cartridge into a case and attaching a case cap on an open end of the case thereby to produce a packaged film product.

For trimming an elongate photographic photosensitive film coil into a sized film and coiling the sized film on a spool, it is the usual practice to operate a feed mechanism such as a sprocket, for example, disposed upstream of a cutting mechanism, to deliver the elongate photographic photosensitive film through the cutting mechanism. After a leading end of the elongate photographic photosensitive film is inserted in a groove in the spool disposed in an inserting position in the film coiling unit, the elongate photographic photosensitive film is fed by a predetermined length between the inserting position and a cutting position in the cutting mechanism. Then, the elongate photographic photosensitive film is trimmed by the cutting mechanism into a sized film with its leading end inserted in the spool.

Various packaged film products that are commercially available contain various sized films of 12, 24, and 36 exposures. These sized films can automatically be coiled around respective spools according to the process described above.

There have been demands for packaged film products containing sized films of 10 or less exposures, e.g., 5 through 10 exposures, typically for use as premiums. However, since sized films of 10 or less exposures are considerably short, before the leading end of the elongate photographic photosensitive film is inserted in the groove in the spool, a region to be trimmed of the elongate photographic photosensitive film is placed in the cutting mechanism. The operation sequence of the existing film producing and packaging system for producing packaged film products containing sized films of 12 or more exposures is different from an operation sequence for producing packaged film products containing sized films of 10 or less exposures, and hence does not lend itself to the production of packaged film products containing sized films of 10 or less exposures.

One solution would be to change the timing of operation of an actuator of the cutting mechanism for cutting an elongate photographic photosensitive film to various different sized films including those of 10 or less exposures. However, it would need a considerably complex control process to switch between different operation modes of the actuator.

In the film supply unit, after a film roll is installed on a reel shaft, the reel shaft is rotated by a servomotor or the like to unwind the film roll at a rate depending on the line speed of the film producing and packaging system which has been set for the type of the packaged film product to be manufactured. The film supply unit includes a perforator for perforating, at spaced intervals, one or both sides of the elongate photographic photosensitive film as it is unreeled from the film roll. The perforator has a sprocket whose teeth engage in the perforations and which is rotated to deliver the elongate photographic photosensitive film at the preset line speed of the film producing and packaging system.

Therefore, the reel shaft and the sprocket are rotated to feed the elongate photographic photosensitive film to a next process at the preset line speed of the film producing and packaging system.

However, if the film roll mounted on the reel shaft suffers diameter variations, then the peripheral speed of the film roll varies even when the reel shaft is rotated at a predetermined rotational speed. When the peripheral speed of the film roll varies, the elongate photographic photosensitive film unreeled from the film roll differs from the line speed of the film producing and packaging system. For example, when the diameter of the film roll becomes smaller, the peripheral speed of the film roll becomes smaller than the speed at which the elongate photographic photosensitive film is fed by the sprocket, resulting in greater tension applied to the elongate photographic photosensitive film.

SUMMARY OF THE INVENTION

It is a general object of the present invention to provide a method of and an apparatus for processing a photographic photosensitive film to produce various sized films of different lengths and to insert leading ends reliably into respective spools under a relatively simple control process through a relatively simple arrangement.

A major object of the present invention is to provide a method of and an apparatus for processing a photographic photosensitive film to unreel the photographic photosensitive film smoothly from a film roll on a reel shaft to a next process without being affected by variations in the diameter of the film roll.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is a perspective view of a second feed mechanism of the film cutting and inserting device;

FIG. 11 is a front elevational view of a cam switching assembly of the second feed mechanism;

FIG. 17 is a timing chart illustrative of the operation of the film cutting and inserting device in a normal mode;

FIG. 19 is a timing chart illustrative of the operation of the film cutting and inserting device in a short film mode;

DETAILED DESCRIPTION OF THE PREFERRED EMBODIMENTS

Figure 1:
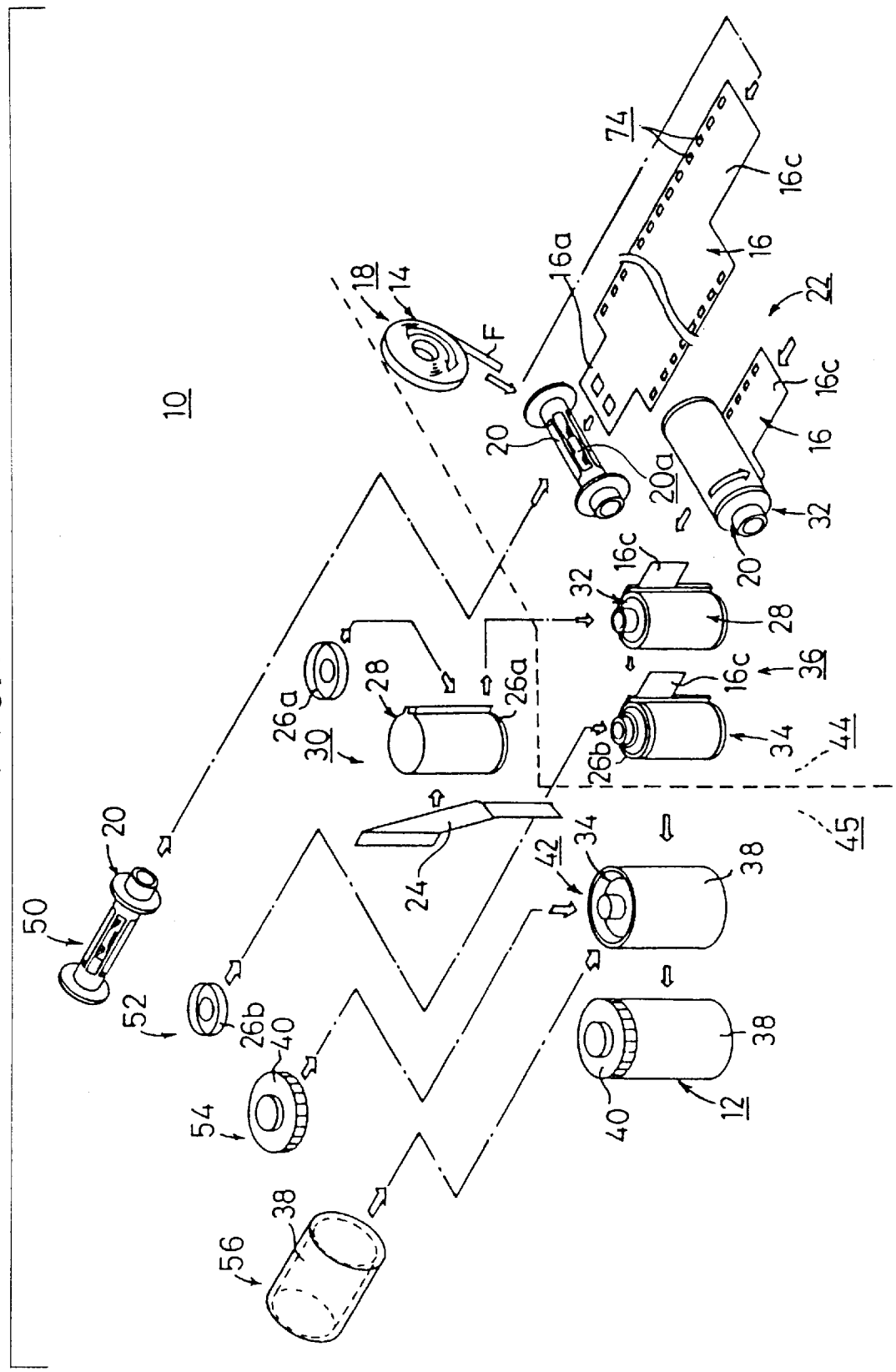
FIG. 1 is a schematic perspective view illustrative of the manner in which a packaged film product is manufactured by a film producing and packaging system which carries out a method of processing a photographic photosensitive film according to an embodiment of the present invention.

FIG. 1 illustrates in schematic perspective the manner in which a packaged film product 12 is manufactured by a film producing and packaging system 10 which carries out a method of processing a photographic photosensitive film according to an embodiment of the present invention. The film producing and packaging system 10 is shown in plan and side elevation in FIGS. 2 and 3, respectively.

Figure 2:
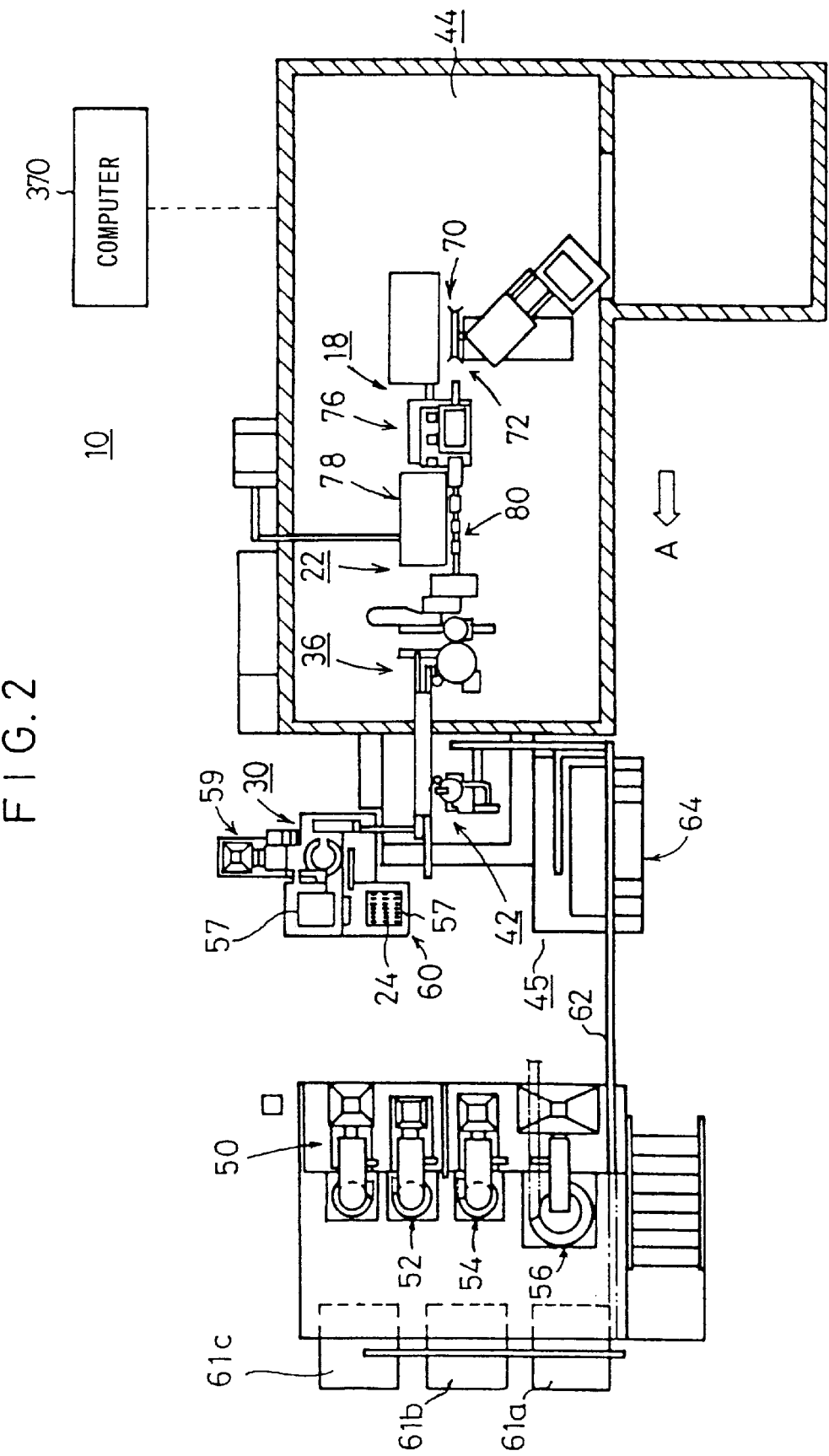
FIG. 2 is a schematic plan view of the film producing and packaging system.
Figure 3:
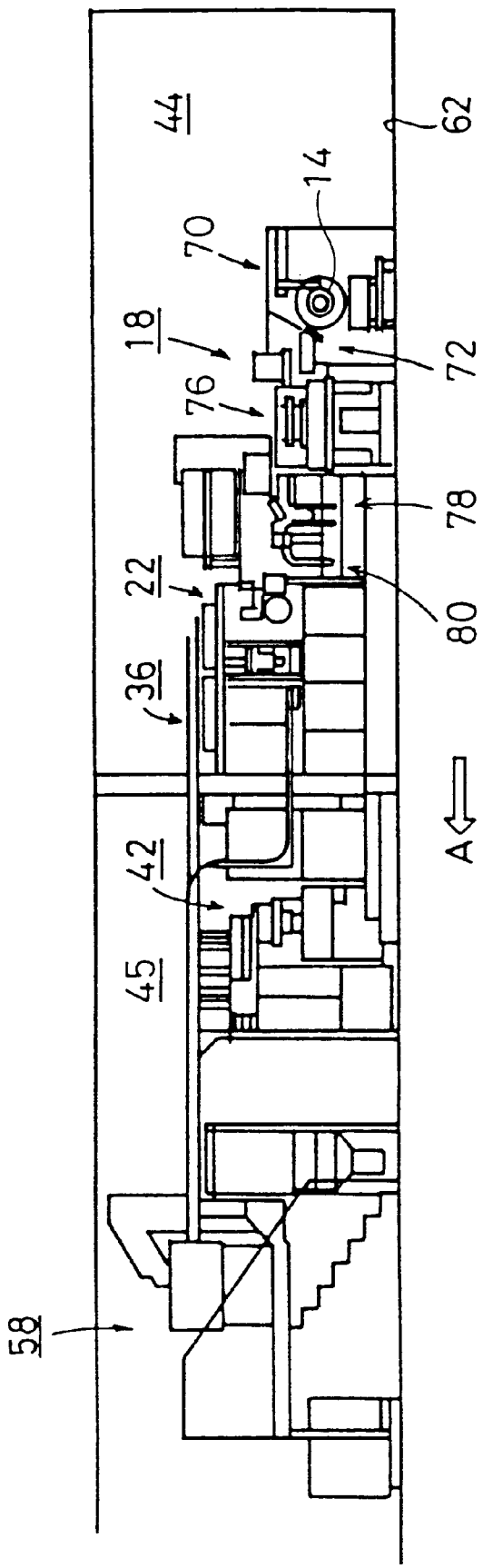
FIG. 3 is a schematic side elevational view of the film producing and packaging system.

As shown in FIGS. 1 through 3, the film producing and packaging system 10 generally comprises a film supply unit 18 for unwinding a film roll 14 of elongate photographic photosensitive film F (hereinafter referred to as elongate film F), cutting the unwound elongate film F into a sized film 16 of given length, and supplying the sized film 16, a film coiling unit 22 for positioning a spool 20 and the sized film 16 relatively to each other and winding the sized film 16 on the spool 20, a cartridge producing unit 30 for rounding a cartridge blank sheet 24 into a tubular form and staking a cap 26a on one end of the tubular form thereby to produce a cartridge 28 with one open end, an assembling unit 36 for inserting a film coil 32, which is made up of the sized film 16 wound on the spool 20, into the cartridge 28 through the open end thereof, and then staking another cap 26b on the open end of the cartridge 28 thereby to produce an assembled cartridge 34, and an encasing unit 42 for placing the assembled cartridge 34 into a case 38 and attaching a case cap 40 to an open end of the case 38 thereby to produce a packaged film product 12. The film supply unit 18, the film coiling unit 22, and the assembling unit 36 are housed in a dark room 44, and other devices, i.e., the encasing unit 42, etc. are housed in a bright room 45.

As shown in FIG. 2, the film supply unit 18, the film coiling unit 22, the assembling unit 36, and encasing unit 42 are arrayed in line with each other along a film producing and packaging process as indicated by the arrow A. Downstream of the film producing and packaging process, there are a spool supply unit 50 for supplying spools 20 to the film coiling unit 22, a cap supply unit 52 for supplying caps 26b to the assembling unit 36, a case cap supply unit 54 for supplying case caps 40 to the encasing unit 42, and a case supply unit 56 for supplying cases 38 to the encasing unit 42. The spool supply unit 50, the cap supply unit 52, the case cap supply unit 54, and the case supply unit 56 are positioned closely to each other.

A cap supply unit 59 for supplying caps 26a and a cartridge blank sheet supply unit 60 for supplying cartridge blank sheets 24 on a pallet 57 are disposed near the cartridge producing unit 30. Packaged film product accumulating units 61a, 61b, 61c are disposed near the parts supply units 50, 52, 54, 56. The packaged film product accumulating units 61a, 61b, 61c and the encasing unit 42 are coupled to each other by a conveyor 62 which is associated with a semifinished product accumulating unit 64.

Figure 4:
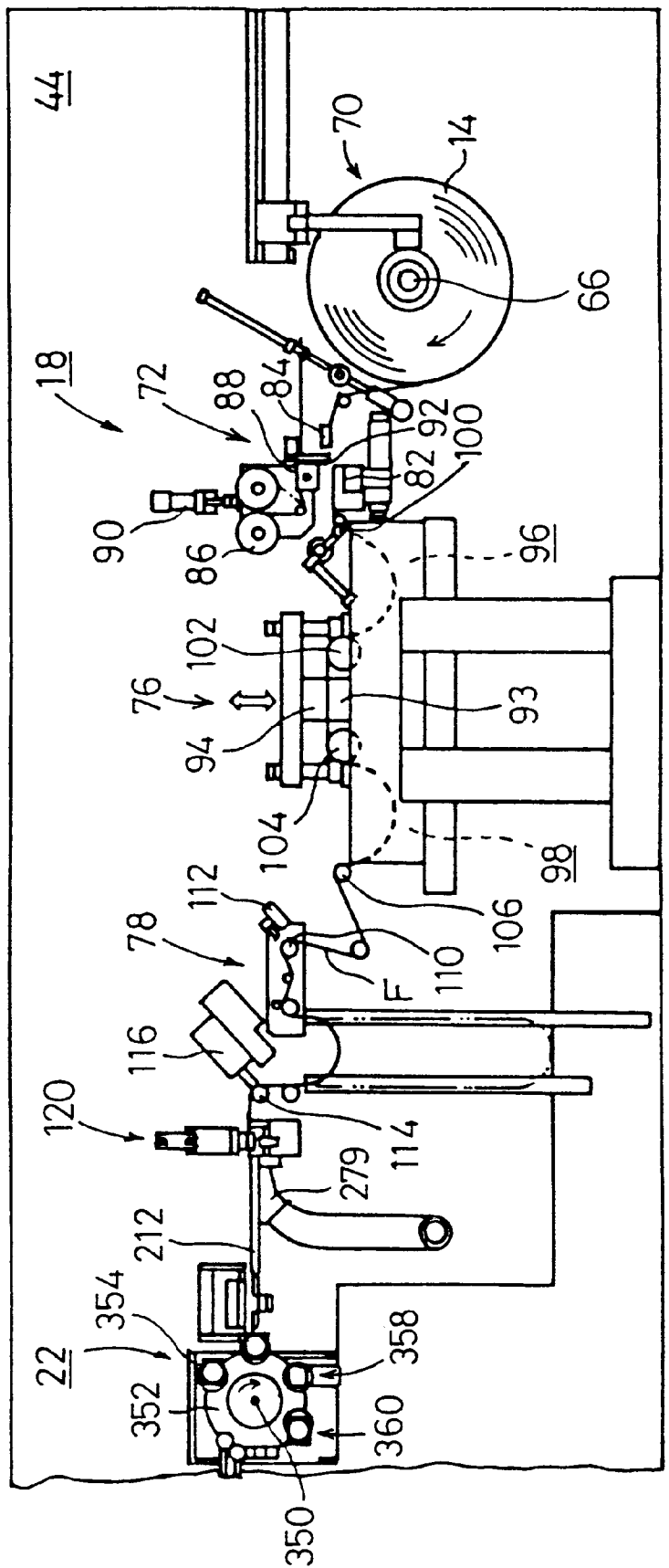
FIG. 4 is a schematic side elevational view of a succession of units ranging from the film supply unit to an assembling unit of the film producing and packaging system.
Figure 5:
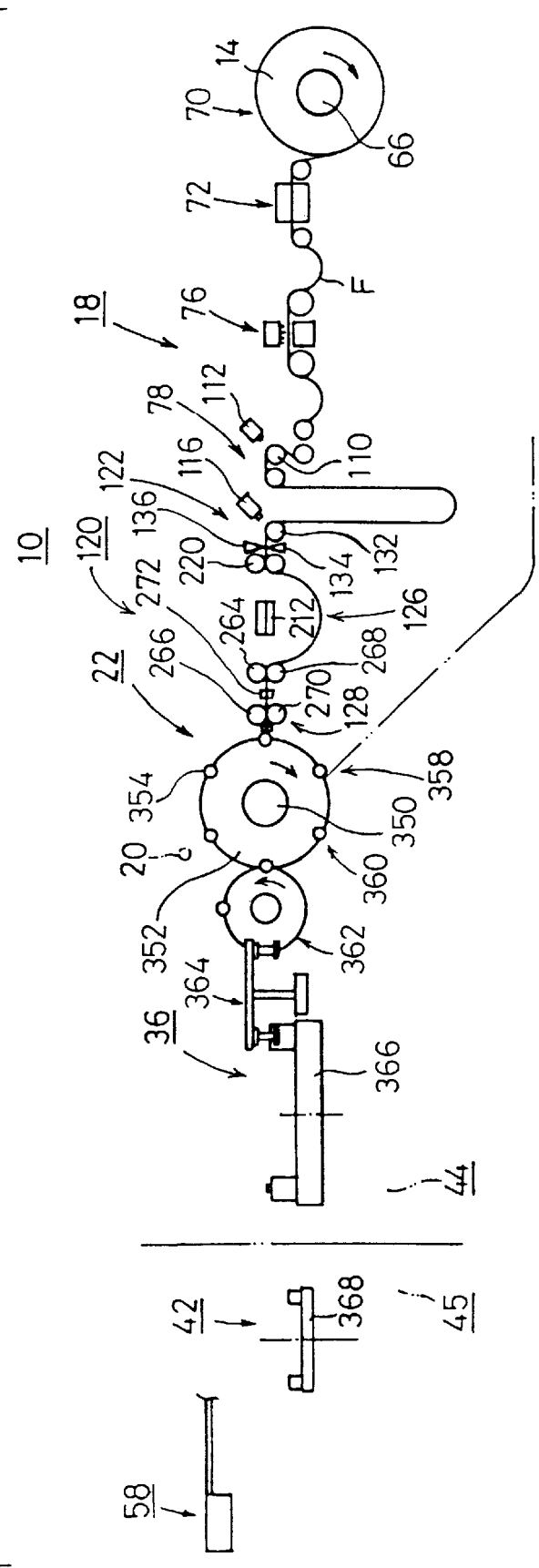
FIG. 5 is a schematic side elevational view of the film supply unit.

As shown in FIGS. 4 and 5, the film supply unit 18 comprises a feeder 70 for holding a film roll 14 on an unreeling shaft 66 and unwinding the film roll 14, a splicer 72 for splicing a trailing end of the film roll 14 to a leading end of a new film roll 14, a perforator 76 for forming perforations 74 (see FIG. 1) in opposite longitudinal sides of an elongate film F unwound from the film roll 14, and a side printer 78 for printing latent image data on one or both of the sides of the elongate film F.

As shown in FIG. 4, the splicer 72 comprises a splicing base 82 for attracting and holding the trailing end of an elongate film F and an auxiliary base 84 for attracting and holding the leading end of a new elongate film F. The splicer 72 also has a rotatable application base 88 of square cross section for feeding a splicing tape 86, which comprises a double-sided adhesive tape, a predetermined length in each feed cycle. The application base 88 is positioned above the splicing base 82 and vertically movable in unison with a tape cutter 92 by a cylinder 90.

The perforator 76 has a fixed die block 93 and a punch block 94 disposed upwardly of the die block 93 and vertically movable by an actuator (not shown) positioned below the die block 93. The perforator 76 also has a pair of suction chambers 96, 98 disposed respectively upstream and downstream of the punch block 94. A path roller 100 and a feed roller 102 are intermittently rotatably positioned upwardly of the suction chamber 96, and a sprocket roller 104 and a path roller 106 are intermittently rotatably positioned upwardly of the suction chamber 98.

The side printer 78 comprises a first printing mechanism 112 disposed in confronting relationship to a constant-speed-feed path roller 110 and a second printing mechanism 116 disposed in confronting relationship to a constant-length-feed path roller 114. The first printing mechanism 112 records a web-shaped print depending on the type of the film as a latent image on one or both sides of elongate films F, and the second printing mechanism 116 records a DX bar code, frame numbers, frame number bar codes, a commercial name, depending on the size of the film as latent images on one or both sides of elongate films F.

Figure 6:
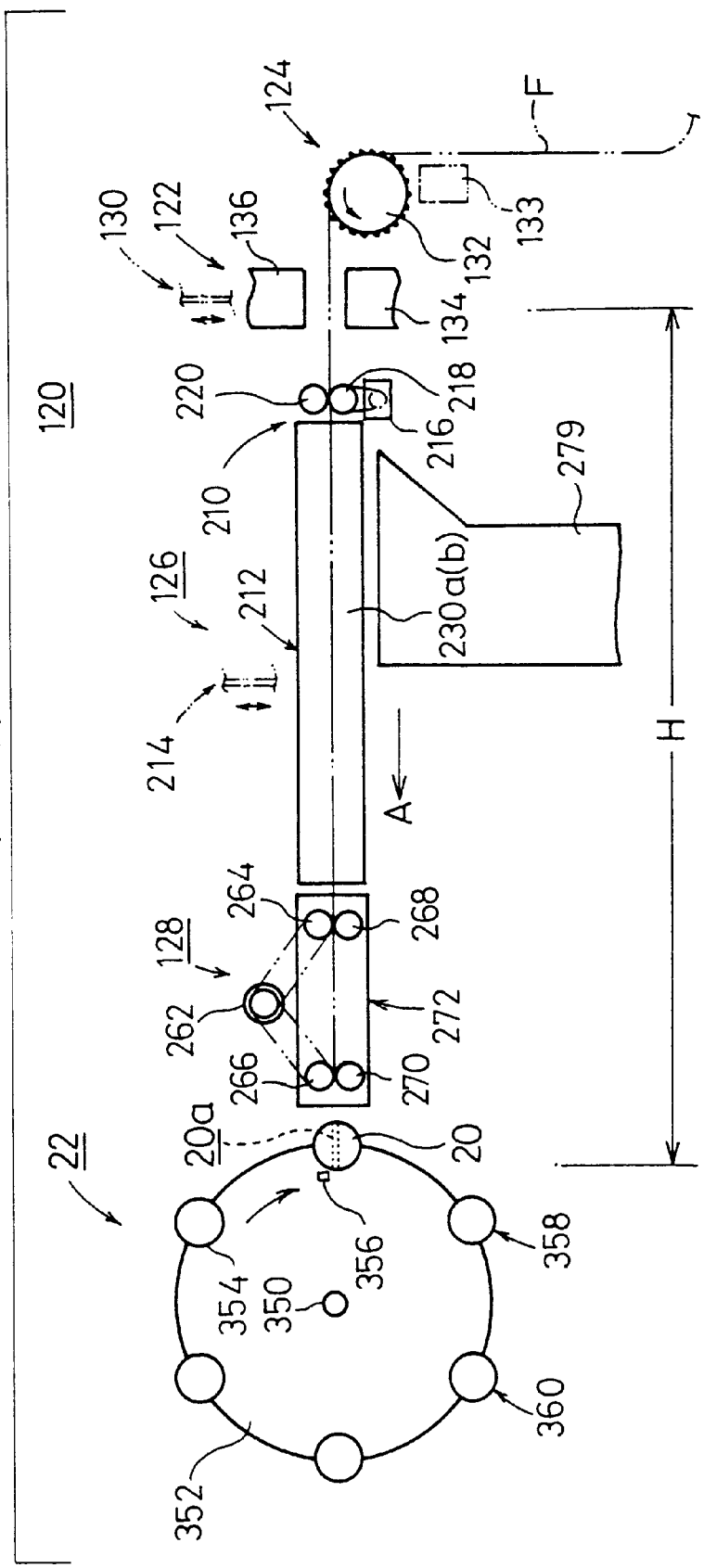
FIG. 6 is a schematic side elevational view of a film cutting and inserting device of the film supply unit.

A film cutting and inserting device (film processing device) 120 is disposed downstream of the side printer 78. As shown in FIGS. 5 and 6, the film cutting and inserting device 120 comprises a cutting mechanism 122 for cutting off the elongate film F into a sized film 16 of given length, a first feed mechanism 124 for feeding the elongate film F a distance equal to the given distance toward the cutting mechanism 122, a second feed mechanism 126 disposed downstream of the first feed mechanism 124, for feeding the trailing end of the sized film 16 toward a spool 20 disposed in an inserting position in the film coiling unit 22, an inserting mechanism 128 disposed near the spool 20, for inserting the leading end of the elongate film F (or the sized film 16) into the spool 20, and a cam switching mechanism 130 for changing the timing of operation of the cutting mechanism 122 depending on the given length.

The first feed mechanism 124 has a sprocket 132 whose teeth can be inserted into the perforations defined in the both sides of the elongate film F, for feeding the elongate film F a constant length in the direction indicated by the arrow A. The sprocket 132 can be rotated about its own axis counterclockwise in the direction indicated by the arrow in FIG. 6 by a servomotor (rotary actuator) 133.

Figure 7:
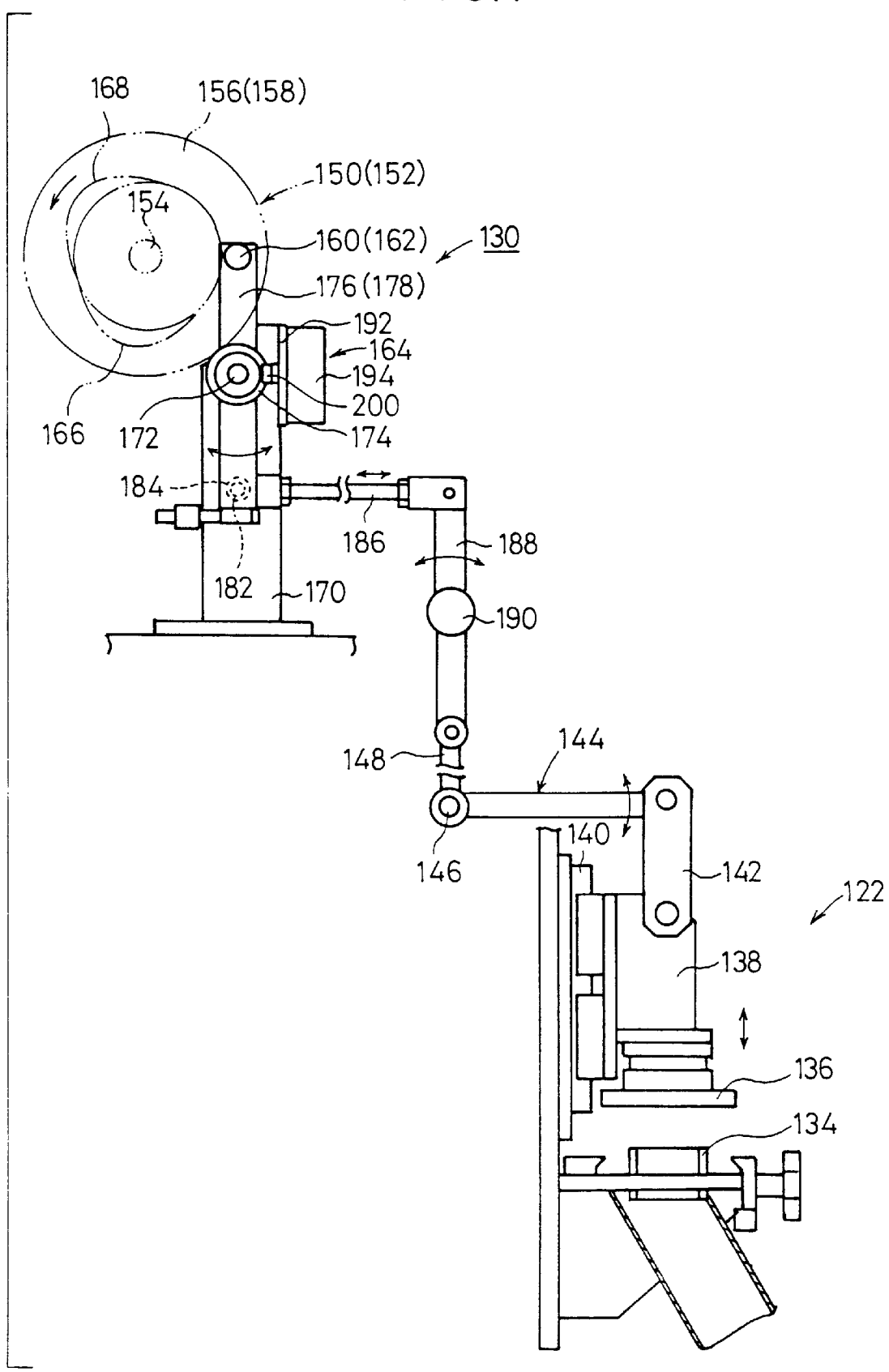
FIG. 7 is a front elevational view of a cutting mechanism and a cam switching mechanism of the film cutting and inserting device.

As shown in FIGS. 5 through 7, the cutting mechanism 122 comprises a fixed blade 134 and a movable blade 136 which are disposed in vertically spaced and confronting relationship to each other. The movable blade 136 is fixed to a lower end of a vertically movable base 138 that is vertically movably supported on a vertically extending rail 140. The vertically movable base 138 has an upper end to which there is pivoted an end of a short link 142 whose other end is pivotally coupled to an end of a long link 144. The other end of the long link 144 integrally coupled to a joint 148 that is angularly movably supported by a pivot 146. The cam switching mechanism 130 is operatively connected to the joint 148.

Figure 8:
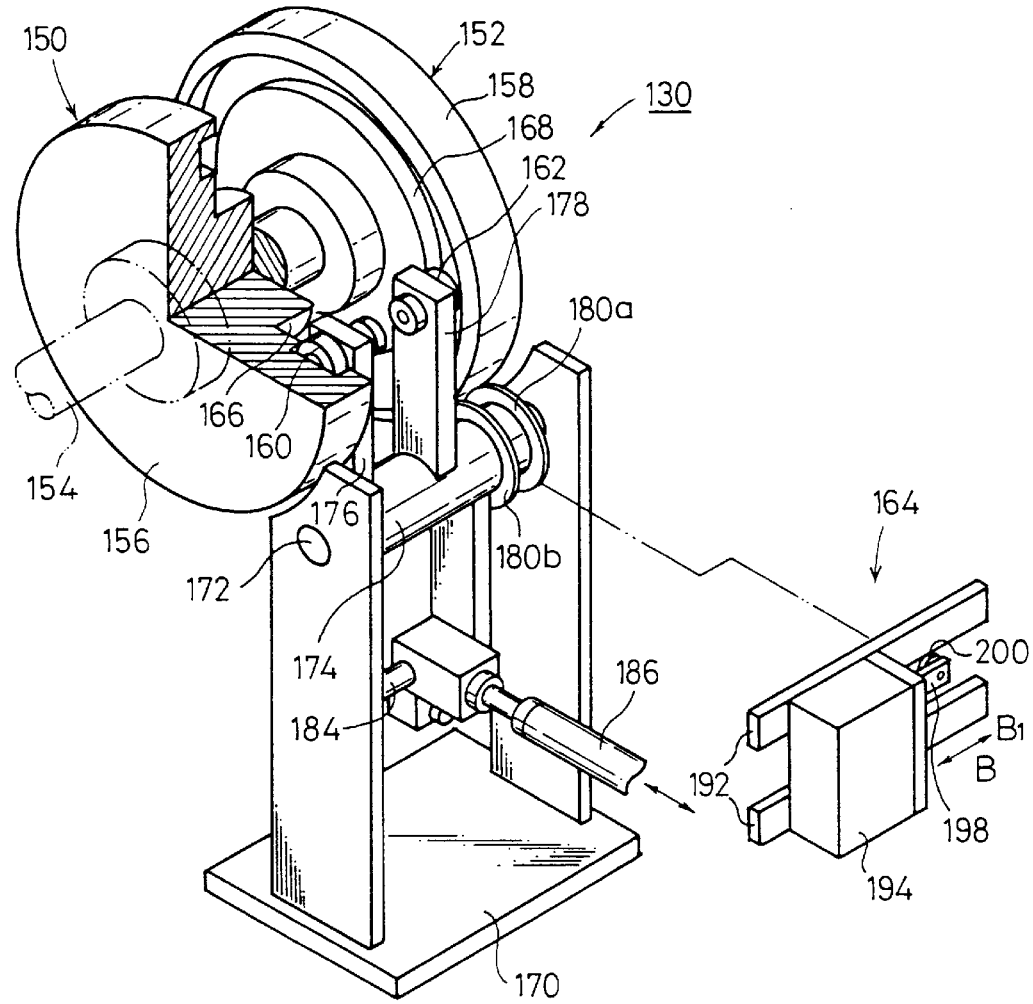
FIG. 8 is a perspective view, partly cut away, of the cam switching mechanism.
Figure 9A:
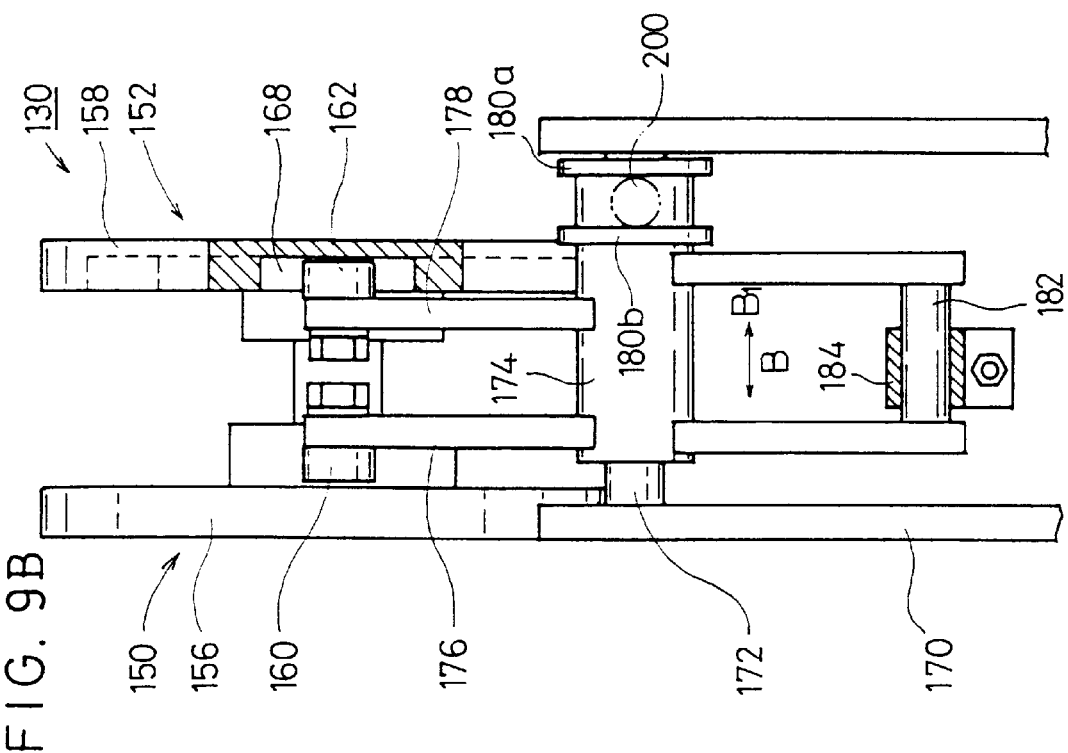
FIG. 9A is a side elevational view of the cam switching mechanism, showing a first cam assembly in an operable state.
Figure 9B:
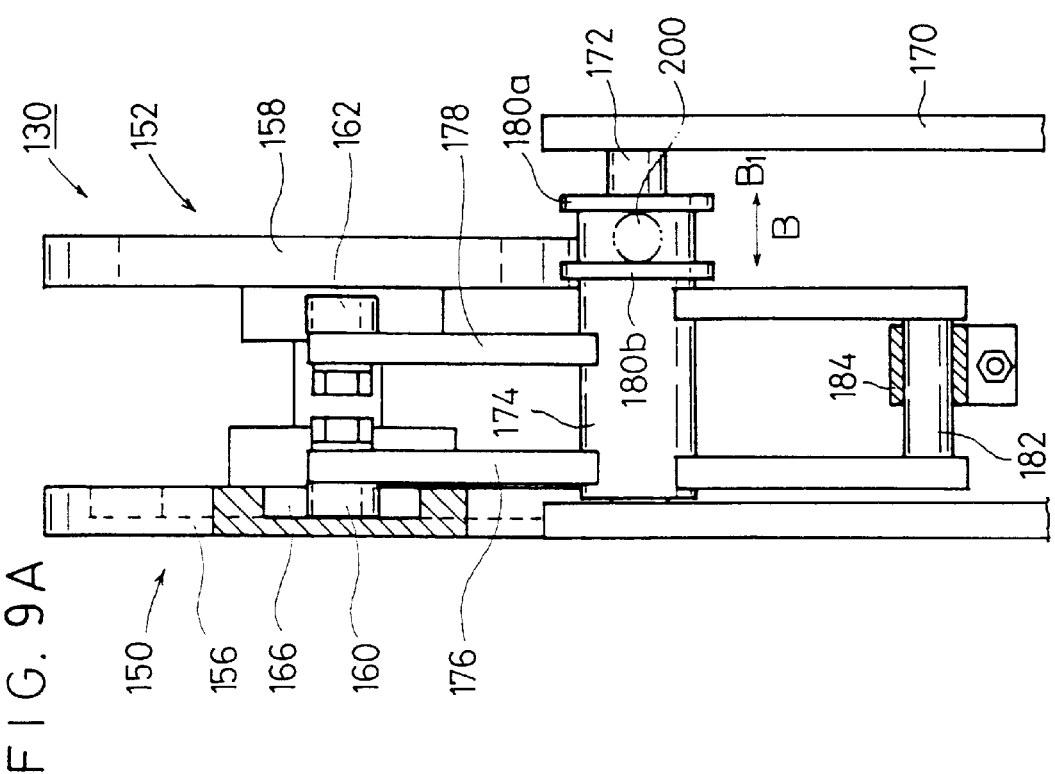
FIG. 9B is a side elevational view of the cam switching mechanism, showing a second cam assembly in an operable state.

The cam switching mechanism 130 comprises first and second cam assemblies 150, 152 selectively connected to the cutting mechanism 122, for changing the timing of operation of the cutting mechanism 122. As shown in FIGS. 8, 9A, and 9B, the first and second cam assemblies 150, 152 have respective first and second cams 156, 158 juxtaposed on a drive shaft 154 for rotation in unison with each other, respective first and second cam followers 160, 162 engageable with the first and second cams 156, 158, respectively, and a switching unit 164 for selectively bringing the first and second cam followers 160, 162 into engagement with the first and second cams 156, 158, respectively.

The first cam 156 has a first cam profile surface 166 for sliding contact with the first cam follower 160, and the second cam 158 has a second cam profile surface 168 for sliding contact with the second cam follower 162. The first and second cam profile surfaces 166, 168 have such a profile that they can actuate the movable blade 136 of the cutting mechanism 122 at respective angular positions. The timing of operation of the movable blade 136 with the first and second cam assemblies 150, 152 will be described later on.

The cam switching mechanism 130 includes a base 170 on which a horizontal rod 172 is mounted in upwardly spaced relation thereto. A movable tube 174 is axially movably fitted over the rod 172 for movement in the directions indicated by the arrow B. First and second swing plates 176, 178 are fixedly mounted on the outer circumferential surface of the movable tube 174 and extend radially across the movable tube 174 in parallel spaced relation to each other. A pair of axially spaced flanges 180a, 180b is mounted on the movable tube 174 near one end thereof on one side of the first and second swing plates 176, 178.

The first and second cam followers 160, 162 are mounted on respective ends of the first and second swing plates 176, 178, and a support shaft 182 is fixed to the other ends of the first and second swing plates 176, 178. A tube 184 is fitted over the support shaft 182 for relative sliding movement with respect thereto. The support shaft 182 and hence the tube 174 are axially movable in the directions indicated by the arrow B with respect to the tube 184. As shown in FIG. 7, the tube 184 is connected to an end of a connecting rod 186 whose other end is pivotally coupled to an upper end of a swing link 188 that is angularly movable about a central shaft 190. The swing link 188 has a lower end coupled to the joint 148.

As shown in FIGS. 7 and 8, the switching unit 164 has a cylinder 194 mounted on a pair of attachment plates 192 parallel to the movable tube 174. The cylinder 194 has a piston rod (not shown) projecting therefrom on which a roller cam 200 is mounted by an arm 198. The roller cam 200 is positioned between the flanges 180a, 180b on the movable tube 174.

As shown in FIG. 6, the second feed mechanism 126 comprises a nip roller pair 210 for gripping and feeding an elongate film F and a sized film F, an openable and closable film guide 212 disposed between the nip roller pair 210 and the inserting mechanism 128, and a cam switching unit 214 for changing the timing of operation of the film guide 212 depending on the length of a sized film F to be cut off. The nip roller pair 210 comprises a drive roller 218 rotatable by a servomotor 216 and a driven roller 220 held in rolling contact with the drive roller 218.

As shown in FIGS. 10 and 11, the film guide 212 has a horizontal support plate 224 fixed to a frame 222 and a pair of parallel rotatable shafts 226a, 226b disposed on the support plate 224. Pairs of joint bars 228a, 228b are fixed at upper ends thereof to axially opposite ends of the rotatable shafts 226a, 226b and at lower ends thereof to guide members 230a, 230b. The guide members 230a, 230b are elongate in the direction indicated by the arrow A, and have respective guide grooves 232a, 232b defined in respective facing sides thereof.

As shown in FIG. 11, the cam switching unit 214 has a fixed bracket 234 which supports a rod 236 on its distal end. A movable tube 238 is fitted over the rod 236 for axial movement thereon, and first and second swing plate 240a, 240b which are axially spaced from each other are mounted on the movable tube 238 and extend upwardly therefrom. First and second cam followers 242a, 242b are supported on respective upper ends of the first and second swing plate 240a, 240b. The first and second cam followers 242a, 242b can selectively engage first and second cams 244a, 244b, respectively, which are fixedly mounted on a drive shaft 246 for rotation therewith.

A switching unit 248 is combined with the movable tube 238. The switching unit 248 is identical in structure to the switching unit 164, and will not be described in detail below.

A swing lever 250 is mounted on and extends downwardly from the movable tube 238. The swing lever 250 has a lower end engaged by a tension spring 252 disposed below the fixed bracket 234. A joint rod 254 has an end pivotally coupled to the swing lever 250 and an opposite end pivotally coupled to an upper end of a swing link 256 that is angularly movable about a central shaft 258. The swing link 256 has a lower end coupled to links 260 which are pivoted to respective joints 261a, 261b secured to the respective rotatable shafts 226a, 226b.

Figure 12:
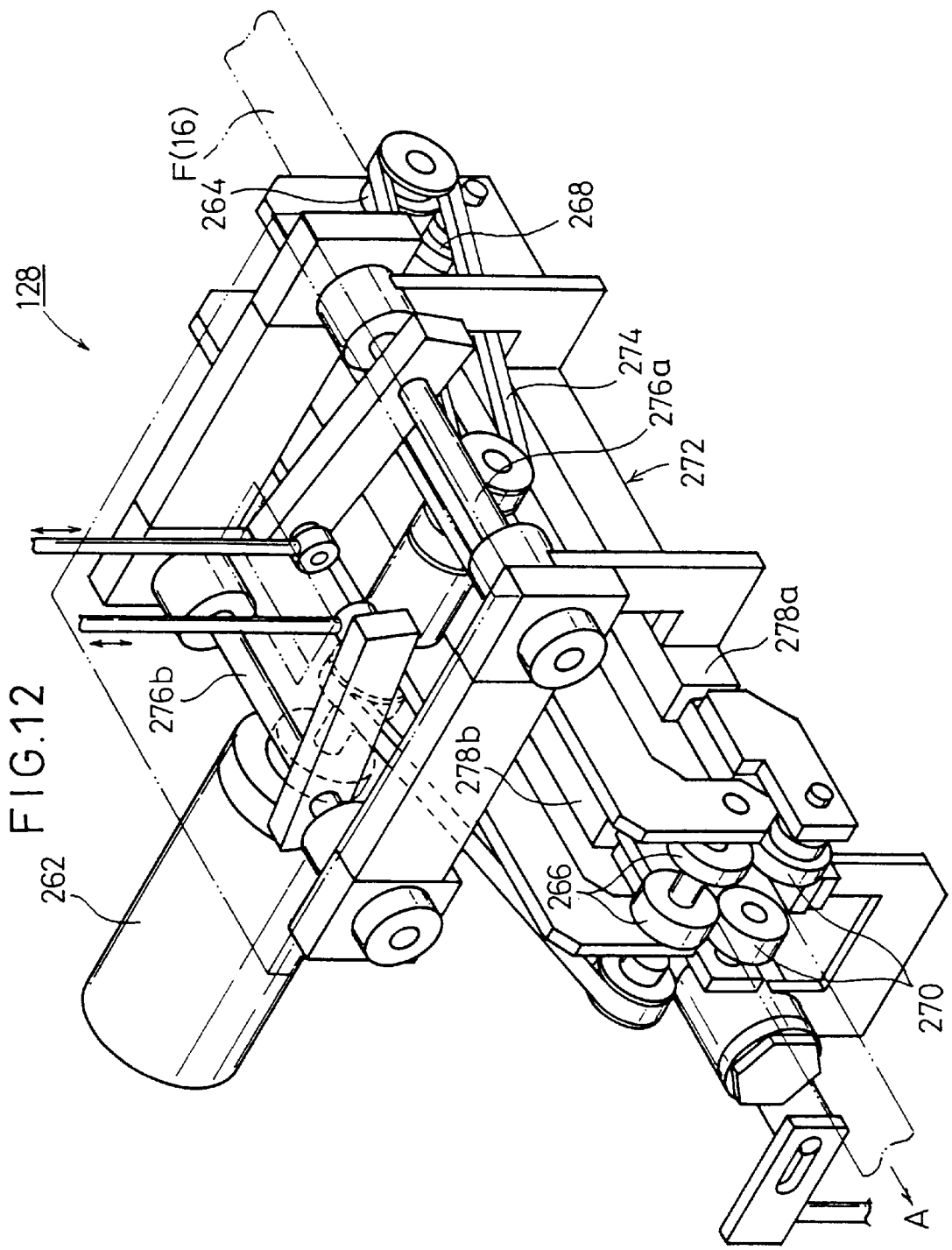
FIG. 12 is a perspective view of an inserting mechanism of the film cutting and inserting device.
Figure 13:
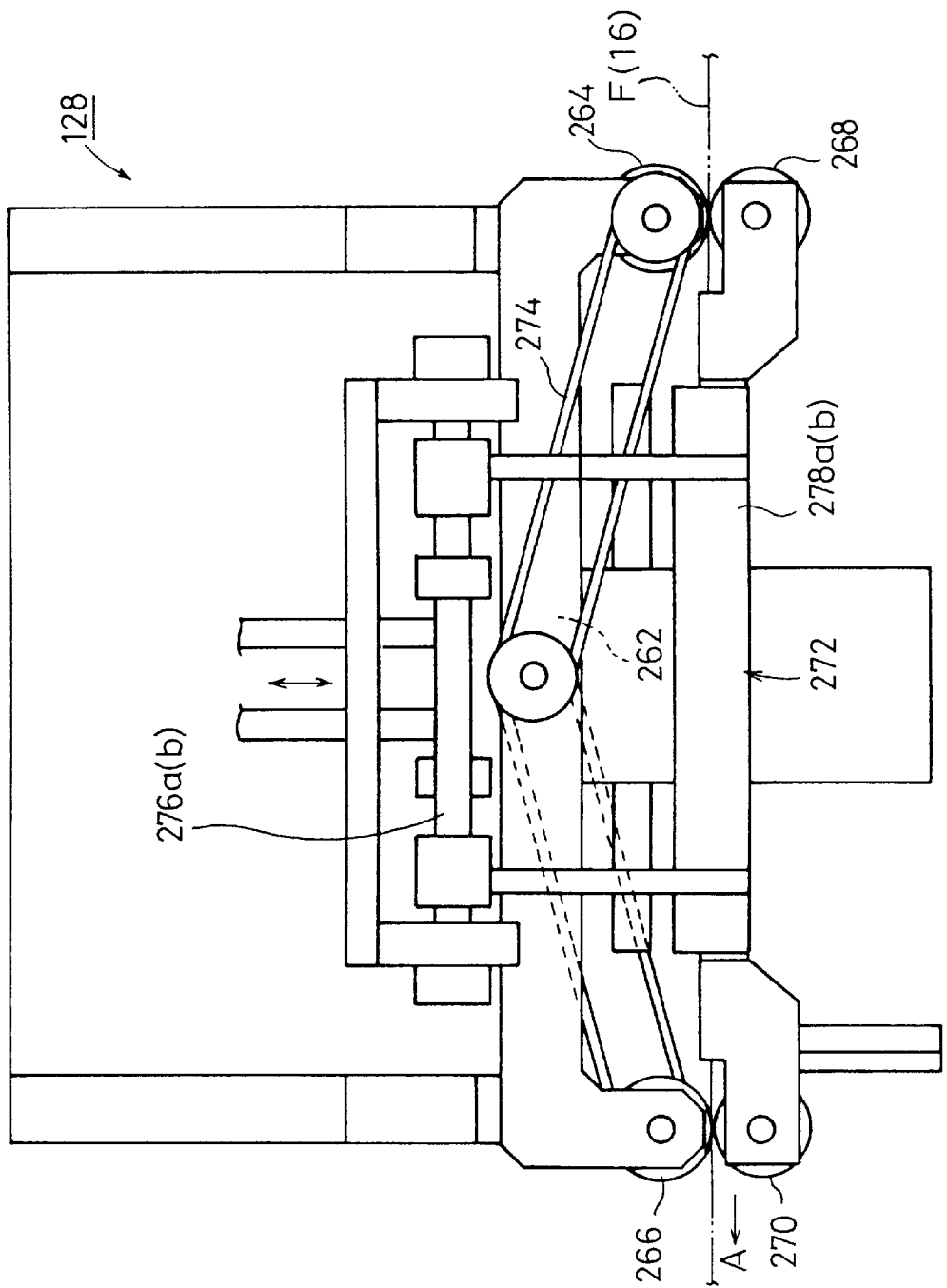
FIG. 13 is a side elevational view of the inserting mechanism.
Figure 14:
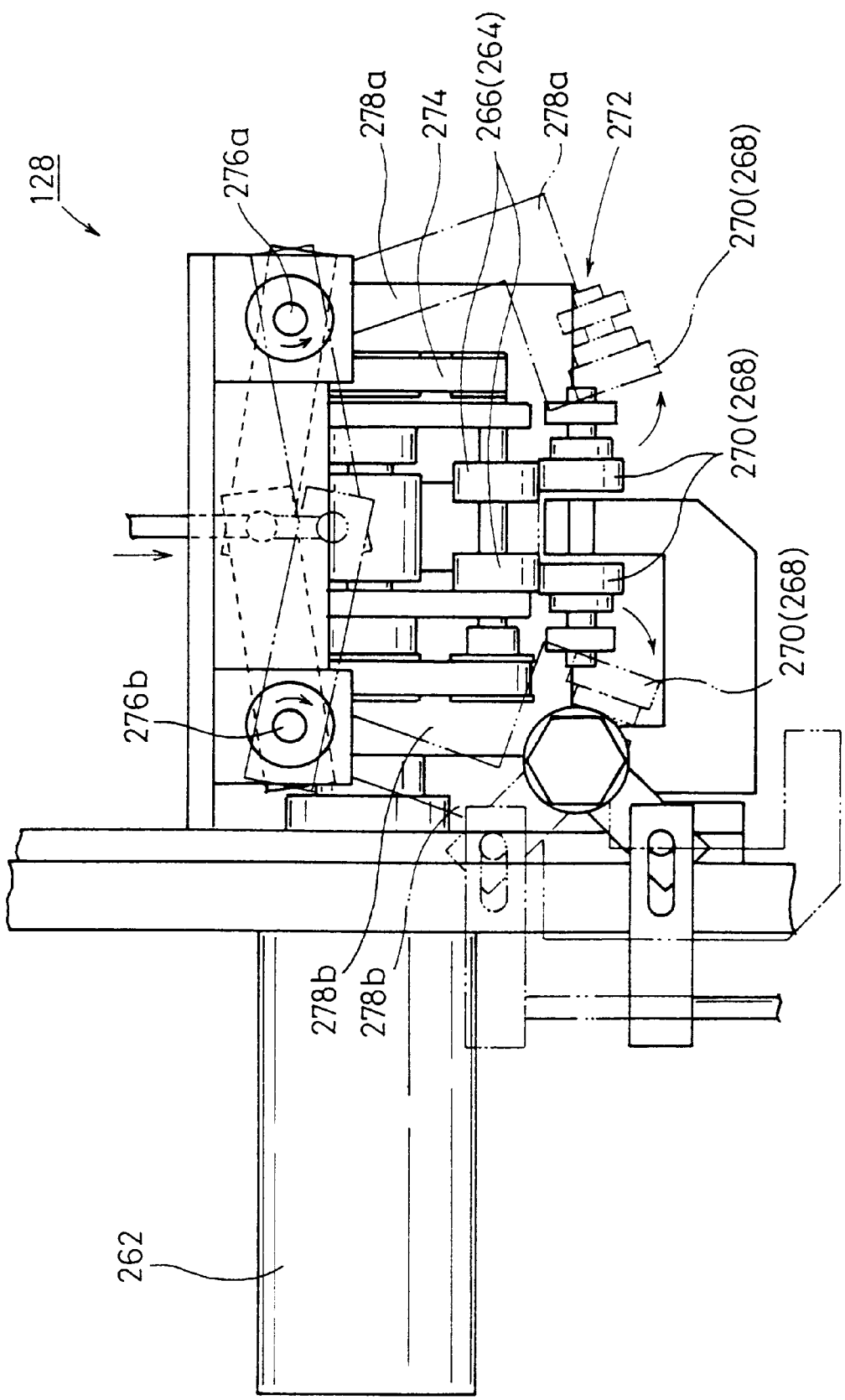
FIG. 14 is a front elevational view of the inserting mechanism.

As shown in FIGS. 12 through 14, the inserting mechanism 128 comprises a pair of first and second inserting rollers 264, 266 rotatable in synchronism with each other by an insertion motor 262 such as a servomotor or the like (rotary actuator), a pair of first and second pinch rollers 268, 270, each split into two roller segments, rollingly engageable with the first and second inserting rollers 264, 266, respectively, and an openable and closable insertion guide 272.

The first and second inserting rollers 264, 266 can be rotated by the insertion motor 262 through a belt and pulley mechanism 274 operatively coupled to the insertion motor 262. The insertion guide 272 comprises a pair of guide plates 278a, 278b swingable about respective support shafts 276a, 276b. The first and second pinch rollers 268, 270 are rotatably supported on the guide plates 278a, 278b, respectively.

As shown in FIG. 6, a discharge port 270 for automatically discharging defective films is positioned below the film guide 212 for movement in a direction normal to the sheet of FIG. 6.

Figure 15:
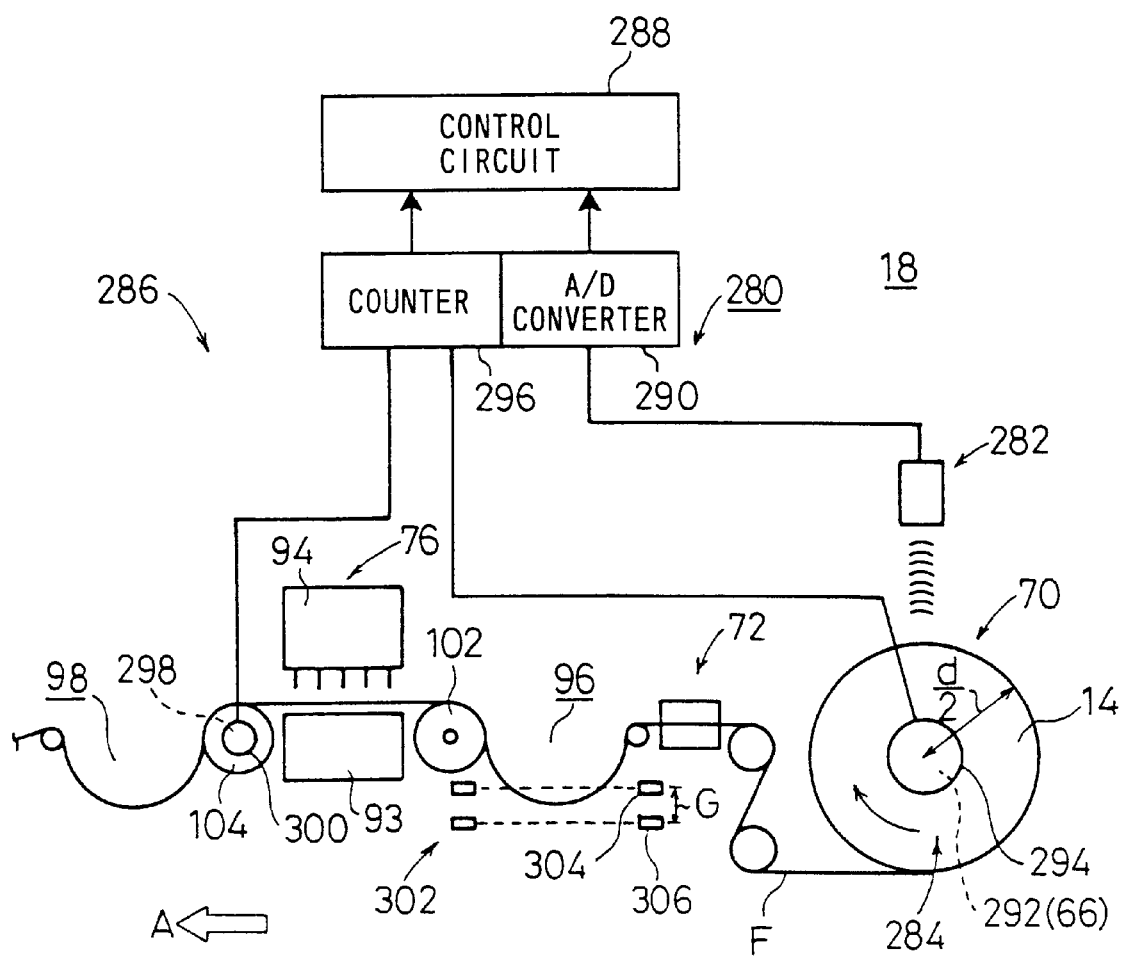
FIG. 15 is a schematic view, partly in block form, of an unreeling control device of the film supply unit.

As shown in FIG. 15, the film supply unit 18 includes an unreeling control device (processor) 280 for controlling the unreeling of a film roll. The unreeling control device 280 comprises an ultrasonic sensor (diameter detecting mechanism) 282 for detecting the diameter of a film roll 14, a revolution detecting mechanism 284 for detecting when the unreeling shaft 66 with the film roll 14 mounted thereon had made one revolution, a feed distance detecting mechanism 286 for detecting a distance by which an elongate film F with perforations 74 is fed, and a control circuit (control mechanism) 288 for controlling the rotational speed of the unreeling shaft 66 based on detected signals from the ultrasonic sensor 282, the revolution detecting mechanism 284, and the feed distance detecting mechanism 286.

The ultrasonic sensor 282 is positioned in confronting relation to an outer circumferential surface of the film roll 14 on the unreeling shaft 66. The ultrasonic sensor 282 applies ultrasonic energy to the outer circumferential surface of the film roll 14 for detecting the diameter d (mm) of the film roll 14. The ultrasonic sensor 282 supplies the detected diameter d (mm) through an A/D converter 290 as a detected signal to the control circuit 288.

The unreeling shaft 66 can be rotated about its own axis by an unreeling motor 292 to which there is coupled a first encoder 294 of the revolution detecting mechanism 284. The first encoder 294 outputs a pulse to a counter 296 each time the unreeling shaft 66 makes one revolution.

The feed distance detecting mechanism 286 has a perforation motor 298 such as a servomotor for rotating the sprocket roller 104. A second encoder 300 is coupled to the perforation motor 298 for outputting a pulse to the counter 296 each time the sprocket roller 104 makes one revolution.

A loop position detecting mechanism 302 for detecting a looped state of the elongate film F is disposed between the unreeling shaft 66 and the perforator 76, i.e., within the suction chamber 96. The loop position detecting mechanism 302 comprises first and second infrared sensors 304, 306 vertically spaced from each other by a distance G for detecting upper and lower limit positions of the elongate film F.

As shown in FIGS. 4 through 6, the film coiling unit 22 comprises a turntable 352 fixed to a main shaft 350 intermittently rotatable in the direction indicated by the arrow, and a plurality of, e.g., six, spool chucks 354 mounted at equal angular intervals on the turntable 352. The turntable 352 has an insertion detector 356 for detecting when a leading end 16a of an elongate film F or a sized film 16 fed from the film supply unit 18 is inserted in a groove 20a (see FIG. 1) in a spool chuck 354 on the turntable 352. The insertion detector 356 comprises a microswitch (not shown) which can be triggered by the leading end 16a that is inserted in and projects from the groove 20a.

The turntable 352 supports thereon a prewinder 358 for prewinding a sized film 16 on a spool 20, and a winder 360 for winding the sized film 16 which has been prewound by the prewinder 358 (see FIG. 6).

As shown in FIG. 5, a first transfer unit 362 and a second transfer unit 364 are disposed downstream of the film coiling unit 22. The first transfer unit 362 receives a film coil 32, which comprises a sized film 16 wound on a spool 20, from one of the spool chucks 354, and converts the film coil 32 from a horizontal attitude to a vertical attitude while making a 180° turn about its own axis. The second transfer unit 364 inserts a film coil 32 received from the first transfer unit 362 into a single-open-ended cartridge 28 placed on an index table 366 of the assembling unit 36.

The encasing unit 42 comprises an index table 368 rotatable about its own axis for indexing movement to angularly spaced positions. The index table 368 can successively be indexed to a case supply station for supplying a case 38, a cartridge inserting station for inserting an assembled cartridge 34 into the case 38, a cartridge detecting station for detecting whether there is an assembled cartridge 34 or not, a case cap inserting station for inserting a case cap 40 into the open end of the case 38, a normal packaged film product discharging station for discharging a normal packaged film product 12, and a defective packaged film product discharging station for discharging a defective packaged film product 12.

As shown in FIG. 2, the film producing and packaging system 10 is controlled by an in-factory network which incorporates a computer 370. The film producing and packaging system 10 is divided into a plurality of blocks that can individually be controlled by respective dedicated computers which are supervised by the computer 370.

Figure 16:
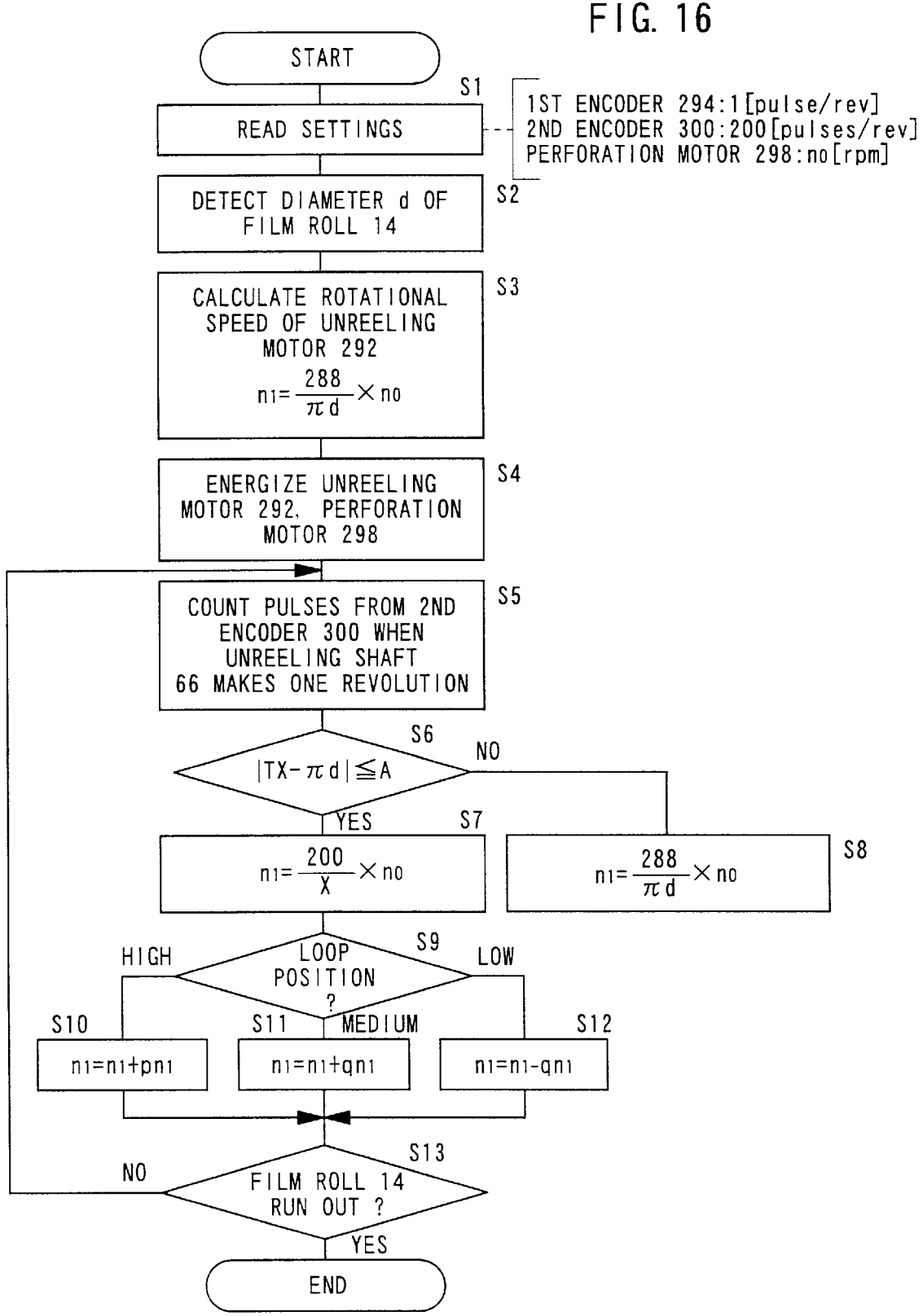
FIG. 16 is a flowchart of an operation sequence of the unreeling control device.

Operation of the film producing and packaging system 10 will be described below in relation to a film processing method according to the embodiment of the present invention, with reference to an operation sequence of the unreeling control device 280 as shown in FIG. 16. In FIG. 16, numerals with a prefix "S", represent step numbers of the operation sequence.

The control circuit 288 of the unreeling control device 280 reads various settings that have been entered in the computer 370 in step S1. Specifically, the control circuit 288 reads such settings that a single pulse per revolution is outputted from the first encoder 294, and 200 pulses per revolution are outputted from the second encoder 300, indicating that the perforation motor 298 rotates at a rotational speed $n_0$ (rpm).

Then, a film roll 14 is mounted on the unreeling shaft 66. Thereafter, the diameter d (mm) of the film roll 14 is detected by the ultrasonic sensor 282 in step S2. Specifically, the ultrasonic sensor 282 applies ultrasonic energy to the outer circumferential surface of the film roll 14, and detects an ultrasonic echo reflected from the outer circumferential surface of the film roll 14 for thereby detecting the diameter d (mm) of the film roll 14. The ultrasonic sensor 282 supplies the detected diameter d (mm) to the A/D converter 290, which supplies a digital signal representing the detected diameter d (mm) to the control circuit 288.

Based on the detected diameter d (mm) of the film roll 14, the control circuit 288 calculates a rotational speed $n_1$ (rpm) of the unreeling motor 292 in step S3. The rotational speed $n_1$ (rpm) is determined to meet such requirements that while the unreeling shaft 66 makes one revolution, the film roll 14 be unreeled a length equal to its circumferential length πd (mm), and while the sprocket roller 104 makes one revolution, the elongate film F be fed a distance of 288 (mm) in the direction indicated by the arrow A. Then, the unreeling motor 292 and the perforation motor 298 are energized to rotate at respective rotational speeds $n_1$ (rpm), $n_0$ (rpm) in step S4.

In the film supply unit 18, the feeder 70 is operated to rotate the film roll 14 in the direction indicated by the arrow, so that the leading end of the unreeled film roll 14 is delivered to the splicer 72. In the splicer 72, as shown in FIG. 4, the trailing end of a preceding elongate film F has been attracted to and held by the splicing base 82, and the leading end of a new elongate film F delivered from the feeder 70 is attracted to and held by the auxiliary base 84.

After the splicing tape 86 is wound around the application base 88, the cylinder 99 is actuated to lower the application base 88 and the tape cutter 92. The splicing tape 86 is now applied to the trailing end of the elongate film F on the splicing base 82 across a certain width. Then, the trailing end of the elongate film F is superimposed on and applied to the leading end of the new elongate film F attracted to the auxiliary base 84, with the splicing tape 86 interposed therebetween.

In the perforator 76, the suction chambers 96, 98 are evacuated to attract an upstream portion of the elongate film F whose trailing end has been spliced between the feed roller 102 and the path roller 100, and also to attract a downstream portion of the elongate film F between the sprocket roller 104 and the path roller 106. The elongate film F is given a predetermined tension between the sprocket roller 104 and the feed roller 102. When the punch block 94 is vertically moved, perforations 74 are formed in opposite sides of the elongate film F by the punch block 94 in coaction with the die block 93.

Then, the feed roller 102 and the sprocket roller 104 are intermittently rotated by an indexing device (not shown) to feed the elongate film F intermittently at a predetermined rate. Thereafter, the punch block 94 is vertically moved to form perforations 74 in opposite sides of the elongate film F in coaction with the die block 93. The above perforating cycle is repeated to form a succession of perforations in opposite sides of the elongate film F at a constant pitch (see FIG. 1).

As shown in FIG. 15, the unreeling motor 292 and the perforation motor 298 are associated respectively with the first and second encoders 294, 300, which supply output pulse signals to the counter 296. Specifically, the first encoder 294 outputs a pulse each time the unreeling shaft 66 makes one revolution, and the second encoder 300 outputs 200 pulses each time the sprocket roller 104 makes one revolution. The counter 296 counts the number X of pulses from the second encoder 300 when the unreeling shaft 66 makes one revolution in step S5.

Then, the circumferential length of the film roll 14 is calculated from the counted number X of pulses, and the rotational speed $n_1$ (rpm) of the unreeling motor 292 is calculated on the basis of the calculated circumferential length of the film roll 14 and the detected diameter d (mm) of the film roll 14. Specifically, if the elongate film F is fed a distance T (mm) by the sprocket roller 104 when the second encoder 300 outputs a pulse, then the distance by which the elongate film F is fed in the direction indicated by the arrow A when the unreeling shaft 66 makes one revolution, i.e., the circumferential length of the film roll 14, is represented by TX (mm). The circumferential length of the film roll 14 which is calculated from the diameter d (mm) of the film roll 14 detected by the ultrasonic sensor 282 is represented by πd (mm). The absolute value of the difference between the circumferential length TX (mm) and the circumferential length ad (mm) is compared with a predetermined constant A in step S6.

If the circumferential length TX (mm) and the circumferential length πd (mm) are close to each other, then the rotational speed $n_1$ (rpm) of the unreeling motor 292 is calculated on the basis of the counted number X of pulses from the second encoder 300 in step S7. If the difference between the circumferential length TX (mm) and the circumferential length πd (mm) larger than the constant A, then the rotational speed $n_1$ (rpm) of the unreeling motor 292 is calculated on the basis of the diameter d (mm) of the film roll 14 detected by the ultrasonic sensor 282 in step S8.

Thereafter, a loop state of the elongate film F in the suction chamber 96 is detected in step S9, and the rotational speed $n_1$ (rpm) of the unreeling motor 292 is corrected. The suction chamber 96 accommodates the first and second infrared sensors 304, 306 which are vertically spaced from each other by the distance G. If both the first and second infrared sensors 304, 306 are turned on, then the elongate film F does not form a predetermined loop in the suction chamber 96. Thereafter, the rotational speed $n_1$ (rpm) of the unreeling motor 292 is increased in step S10.

If any loop formed by the elongate film F is positioned in a predetermined range in the suction chamber 96, then the first infrared sensor 304 is turned off, and the second infrared sensor 306 is turned on. Thereafter, the rotational speed $n_1$ (rpm) of the unreeling motor 292 is slightly increased in step S11. If any loop formed by the elongate film F extends excessively downwardly beyond the predetermined range in the suction chamber 96, then both the first and second infrared sensors 304, 306 are turned off, and the rotational speed $n_1$ (rpm) of the unreeling motor 292 is reduced in step S12. In steps S10, S11, S12, p and q represent constants with p>q. The operation sequence shown in FIG. 16 is continuously carried out until the film roll 14 runs out in step S13.

In this embodiment, the ultrasonic sensor 282 is positioned in confronting relation to the outer circumferential surface of the film roll 14 on the unreeling shaft 66. The ultrasonic sensor 282 detects the diameter d (mm) of the film roll 14, and the rotational speed $n_1$ (rpm) of the unreeling motor 292 is calculated on the basis of the detected diameter d (mm). Therefore, even if the diameter d (mm) of the film roll 14 on the unreeling shaft 66 varies, the rotational speed $n_1$ (rpm) of the unreeling motor 292 can be calculated on the basis of the diameter d (mm) of the film roll 14 detected by the ultrasonic sensor 282 and the rotational speed $n_0$ (rpm) of the perforation motor 298, for thereby allowing the film roll 14 to be unreeled smoothly and reliably.

Specifically, if the rotational speed $n_1$ (rpm) of the unreeling motor 292 were calculated only on the basis of the rotational speed $n_0$ (rpm) of the perforation motor 298, then when the diameter d (mm) of the film roll 14 is smaller than a given diameter, the circumferential length πd (mm) of the film roll 14 would be reduced, and the speed at which the elongate film F is fed from the unreeling shaft 66 would be smaller than the speed at which the elongate film F is fed by the perforation motor 298, so that the elongate film F would be subject to a large tension. When the diameter d (mm) of the film roll 14 is greater than the given diameter, the length by which the elongate film F is unreeled from the unreeling shaft 66 would be increased, resulting in an excessively length of the elongate film F unreeled from the unreeling shaft 66 toward the perforation motor 298.

According to the present embodiment, however, the diameter d (mm) of the film roll 14 on the unreeling shaft 66 is detected, and the unreeling motor 292 is controlled on the basis of the detected diameter d (mm). Consequently, the elongate film F can be unreeled at a desired rate reliably from the unreeling shaft 66 toward the perforation motor 298.

In this embodiment, furthermore, the rotational speed $n_1$ (rpm) of the unreeling motor 292 is controlled on the basis of the diameter d (mm) of the film roll 14 detected by the ultrasonic sensor 282 and the distance TX by which the elongate film F is fed in the direction indicated by the arrow A by the perforation motor 298 when the unreeling shaft 66 makes one revolution. Accordingly, the elongate film F unreeled from the unreeling shaft 14 can always be fed smoothly at high accuracy to a next process.

Moreover, the loop position detecting mechanism 302 for detecting a looped state of the elongate film F is disposed within the suction chamber 96. Since the rotational speed $n_1$ (rpm) of the unreeling motor 292 is corrected on the basis of the detected looped state of the elongate film F, the rate at which the elongate film F is unreeled is effectively corrected.

The perforated elongate film F is fed to the side printer 78 where latent images of strip-like prints depending on the film type are formed on one or both sides of the elongate film F by the first printing mechanism 112. The printed elongate film F forms a free loop between the path roller 110 and the sprocket 132, after which the second printing mechanism 116 above the sprocket 132 records a DX bar code, frame numbers, frame number bar codes, and a commercial name, depending on the film size as latent images on one or both sides of elongate film F.

The elongate film F which has passed through the side printer 78 is introduced into the film cutting and inserting device 120. The film cutting and inserting device 120 is operable selectively in two different modes, i.e., a normal mode and a short film mode, depending on the length of sized films 16 to be wound around spools 20. Specifically, a distance H from a cutting position in the cutting mechanism 122 to the inserting position in the film coiling unit 22 is used as a reference distance, and sized films 16 having 12 or more exposures are longer than the reference distance H and sized films 16 having 10 or less exposures are shorter than the reference distance H. If sized films 16 to be wound on spools 20 are longer than the reference distance H, then the film cutting and inserting device 120 enters the normal mode. If, conversely, sized films 16 to be wound on spools 20 are shorter than the reference distance H, then the film cutting and inserting device 120 enters the short film mode.

A process of cutting the elongate film F into a sized film 16 having 12 or more exposures, for example, and inserting the leading end of the sized film 16 into a spool, which is carried out by the film cutting and inserting device 120 operating in the normal mode will be described below with reference to FIGS. 17 and 18A through 18D. In the normal mode, the first cam assembly 150 of the cam switching mechanism 130 is operational (see FIG. 9A), and the first cam follower 242a of the cam switching unit 214 engages the first cam 244a.

The servomotor 133 of the first feed mechanism 124, the servomotor 216 of the second feed mechanism 126, and the insertion motor 262 of the inserting mechanism 128 are energized in synchronism with each other. The elongate film F is fed in the direction indicated by the arrow A by the sprocket 132 whose teeth are inserted in the perforations 74 defined in the both sides of the elongate film F. The leading end of the elongate film F passes through the cutting mechanism 122 into the nip roller pair 210 of the second feed mechanism 126.

Figure 18A:
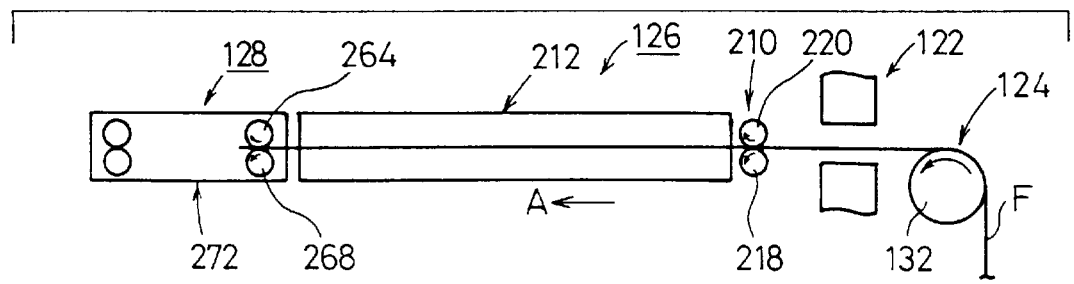
FIG. 18A is a side elevational view showing the manner in which an elongate film is fed in the normal mode.
Figure 18B:
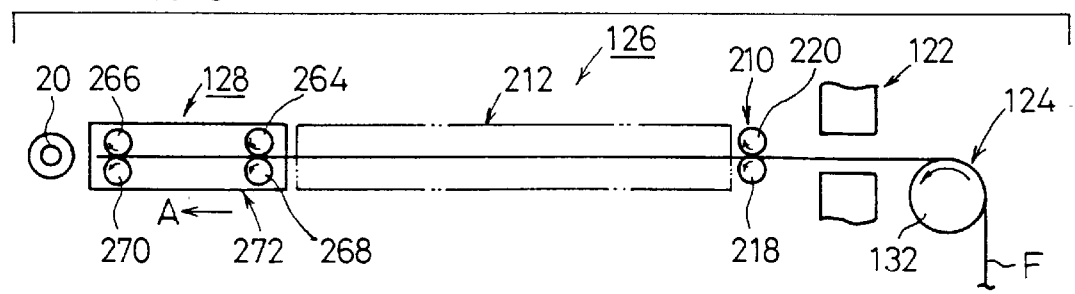
FIG. 18B is a side elevational view showing the manner in which a film guide is open in the normal mode.
Figure 18C:
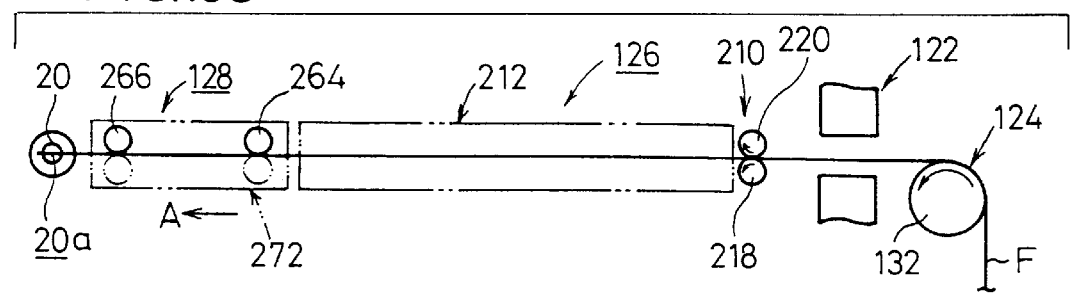
FIG. 18C is a side elevational view showing the manner in which a leading end of the elongate film is inserted into a spool in the normal mode.
Figure 18D:
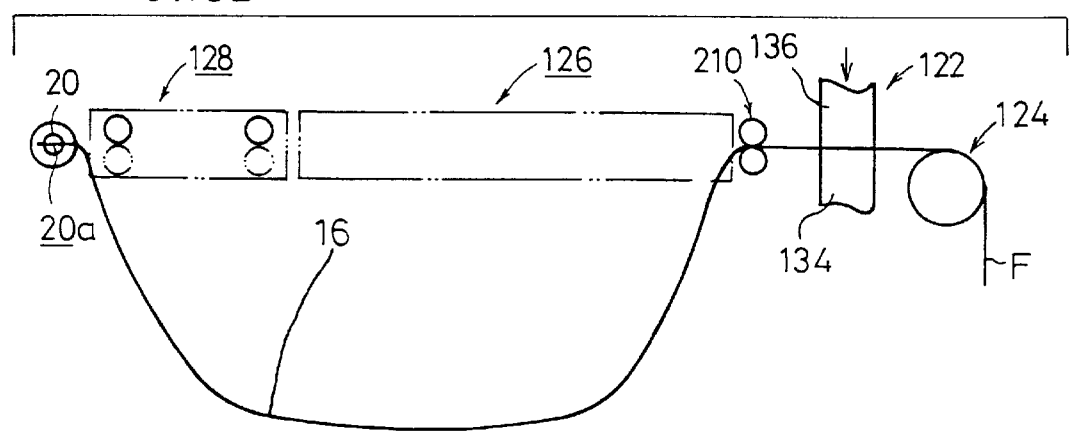
FIG. 18D is a side elevational view showing the manner in which the elongate film is cut off in the normal mode.

In the nip roller pair 210, the drive roller 218 is rotated to feed the elongate film F in the direction indicated by the arrow A while the elongate film F is being gripped between the drive roller 218 and the driven roller 220. At the same time, the opposite longitudinal sides of the elongate film F are supported respectively in the guide grooves 232a, 232b in the guide members 230a, 230b of the film guide 212. The leading end of the elongate film F is inserted from the film guide 212 into the inserting mechanism 128 where it is gripped between the first inserting roller 264 and the first pinch roller 268, as shown in FIG. 18A. The leading end of the elongate film F is then guided by the guide plates 278a, 278b and inserted between the second inserting roller 266 and the second pinch roller 270, as shown in FIG. 18B. Thereafter, the leading end of the elongate film F is inserted into the groove 20a in the spool 20 supported on the turntable 352, as shown in FIG. 18C.

When the leading end of the elongate film F is delivered to the inserting mechanism 128, the film guide 212 is opened. Specifically, as shown in FIG. 11, the drive shaft 246 is rotated to rotate the first and second cams 244a, 244b in unison with each other, and the first cam follower 242a engaging the first cam 244a moves along the cam profile of the first cam 244a.

Since the first cam follower 242a is mounted on the upper end of the first swing plate 240a, the first swing plate 240a is turned with the movable tube 238 about the rod 236. When the movable tube 238 is turned in a given direction, the swing lever 250 coupled thereto also swings, causing the joint rod 254 to turn the swing link 256 about the shaft 258.

The swinging movement of the swing link 256 is converted by the links 260 to angular movement of the rotatable shafts 226a, 226b about their axes. The guide members 230a, 230b supported on the respective rotatable shafts 226a, 226b by the joint bars 228a, 228b are now angularly moved away from each other, releasing the elongate film F from the film guide 212.

The leading end of the elongate film F delivered into the inserting mechanism 128 is inserted into one end of the groove 20a in the spool 20 supported on the turntable 352 in the inserting position, and projects from the other end of the groove 20a. The projecting end of the elongate film F triggers the microswitch (not shown) of the insertion detector 356 (see "INSERTION DETECTED" in FIG. 17). In response to a detected signal from the insertion detector 356, the insertion guide 272 of the inserting mechanism 128 is actuated to turn the guide plates 278a, 278b in a direction (opening direction) away from each other for thereby releasing the elongate film F.

The first and second pinch rollers 268, 270 mounted respectively on the guide plates 278a, 278b are also turned in unison with the guide plates 278a, 278b, and the insertion motor 262 is de-energized.

The elongate film F is delivered a predetermined length from the cutting position in the direction indicated by the arrow A by the sprocket 132 and the nip roller pair 210, forming a loop between the spool 20 and the nip roller pair 210. After the elongate film F is delivered the predetermined length, the sprocket 132 and the nip roller pair 210 are stopped, and the cutting mechanism 122 is actuated (see FIG. 18D).

As shown in FIGS. 7 and 8, the first cam follower 160 engages the first cam 156 which is rotating with the drive shaft 154, and hence is displaced along the first cam profile surface 166 of the first cam 156. The displacement of the first cam follower 160 is converted into swinging movement of the first swing plate 176, which causes the support shaft 182 mounted thereon to swing about the rod 172.

As shown in FIG. 7, the swing link 188 coupled to the support shaft 182 by the connecting rod 186 is turned about the shaft 190, whereupon the long link 144 swings downwardly about the pivot 146. Since the long link 144 is connected through the short link 142 to the vertically movable base 138, the vertically movable base 138 moves downwardly along the rail 140. The movable blade 136 fixed to the vertically movable base 138 is lowered, cutting (trimming) the elongate film F into a sized film 16 of given length in coaction with the fixed blade 134.

The trailing end 16c of the sized film 16 thus cut off by the cutting mechanism 122 is fed in the direction indicated by the arrow A by the nip roller pair 210. The trailing end 16c of the sized film 16 is released from the nip roller pair 210, and the leading end 16a thereof is supported in the spool 20.

As shown in FIG. 6, the turntable 352 is then rotated to move the spool 20 with the sized film 16 inserted therein to the prewinder 358, and the prewinder 358 is actuated to prewind the sized film 16 around the spool 20. The turntable 352 is further rotated to bring the spool 20 with the prewound sized film 16 to the winder 360, which winds the sized film 16 around the spool 20, thus producing a film coil 32.

As shown in FIG. 5, after the film coil 32 is delivered to the first transfer unit 362, the film coil 32 is angularly moved 90° from a horizontal attitude to a vertical attitude, and the film coil 32 in the vertical attitude is gripped by the second transfer unit 364. The second transfer unit 364 then transfers the received film coil 32 in the vertical attitude onto the index table 366 of the assembling unit 36, and inserts the film coil 32 into a single-open-ended cartridge 28 placed on the index table 366.

Thereafter, a cap 26b is pressed and crimped in the upper open end of the single-open-ended cartridge 28, producing an assembled cartridge 34. The assembled cartridge 34 is then delivered from the dark room 44 into the bright room 45, where the assembled cartridge 34 is fed to the encasing unit 42.

In the encasing unit 42, a case 38 is delivered to the index table 368, and the assembled cartridge 34 is inserted into the case 38. Then, a case cap 40 is inserted into the open end of the case 38 in which the assembled cartridge 34 has been inserted, producing a packaged film product 12. The packaged film product 12 is fed onto the conveyor 62, from which it is introduced selectively into the packaged film product accumulating units 61a, 61b, 61c.

A process of cutting the elongate film F into a sized film 16 having 5 exposures, for example, and inserting the leading end of the sized film 16 into a spool, which is carried out by the film cutting and inserting device 120 operating in the short film mode will be described below with reference to FIGS. 19 and 20A through 20D.

First, the timing of operation of the cutting mechanism 122 and the film guide 212 is changed as follows: As shown in FIGS. 7, 8, and 9A, 9B, the cylinder 194 of the switching unit 164 is actuated to cause the arm 198 to move the cam 200 in the direction indicated by the arrow B1. The first cam follower 160 disengages from the first cam profile surface 166 of the first cam 156, and the second cam follower 162 engages the second cam profile surface 168 of the second cam 158, as shown in FIG. 9B. The second cam assembly 152 is now rendered operational.

As shown in FIG. 11, the switching unit 248 of the cam switching unit 214 is similarly operated. The movable tube 238 is axially displaced to move the first cam follower 242a out of rolling engagement with the first cam 244a and the second cam follower 242b into rolling engagement with the second cam 244b.

Thereafter, the feeder 70 is actuated to deliver the elongate film F unreeled from the film roll 14 to the film cutting and inserting device 120. The first feed mechanism 124, the second feed mechanism 126, and the inserting mechanism 128 are now operated in synchronism with each other. The elongate film F is fed a predetermined length in the direction indicated by the arrow A by the sprocket 132 and the nip roller pair 210 while being guided by the film guide 212.

Figure 20A:
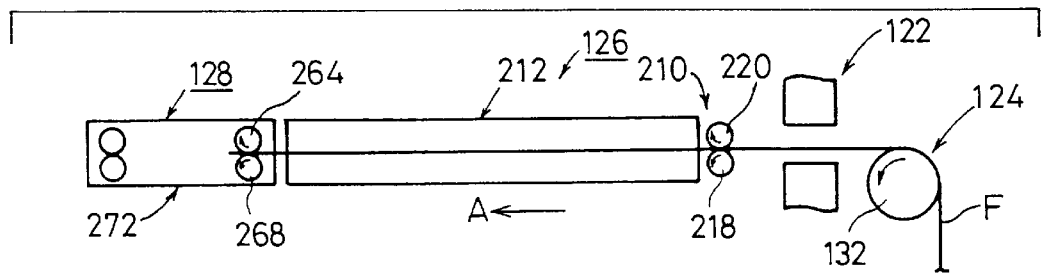
FIG. 20A is a side elevational view showing the manner in which an elongate film is fed in the short film mode.

When the leading edge of the elongate film F thus fed is gripped by the first inserting roller 264 and the first pinch roller 268, the first feed mechanism 124, the second feed mechanism 126, and the inserting mechanism 128 are inactivated, as shown in FIG. 20A.

Figure 20B:
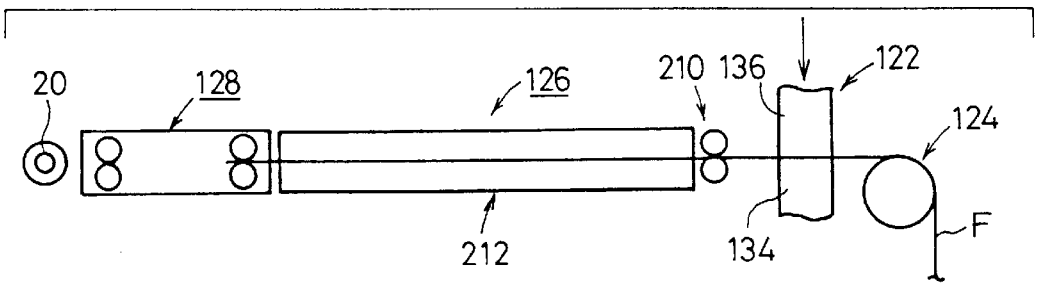
FIG. 20B is a side elevational view showing the manner in which the elongate film is cut off in the short film mode.

Then, the cutting mechanism 122 is actuated. Since the second cam assembly 152 has been rendered operational by the cam switching mechanism 130, the second cam follower 242b is displaced along the second cam profile surface 168 of the second cam 244b. The swing link 188 swings at an earlier time than in the normal mode, lowering the movable blade 136 in unison with the vertically movable base 138, as shown in FIG. 20B. Therefore, the elongate film F is severed into a sized film 16 of 5 exposures which is shorter than the sized film 16 produced in the normal mode.

Figure 20C:
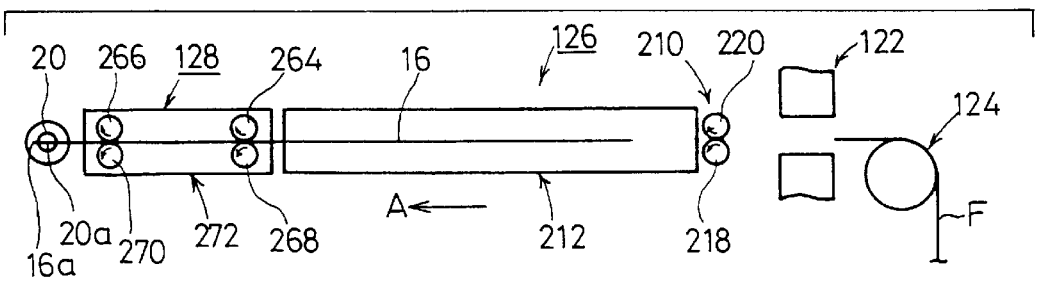
FIG. 20C is a side elevational view showing the manner in which a leading end of a sized film is inserted into a spool in the short film mode.

Then, as shown in FIG. 20C, the second feed mechanism 126 and the inserting mechanism 128 are operated to insert the leading end 16a of the sized film 16 into the groove 20a in the spool 20. When the leading end 16a is detected by the insertion detector 356, the second feed mechanism 126 and the inserting mechanism 128 are stopped, and the film guide 212 and the insertion guide 272 are operated.

Figure 20D:
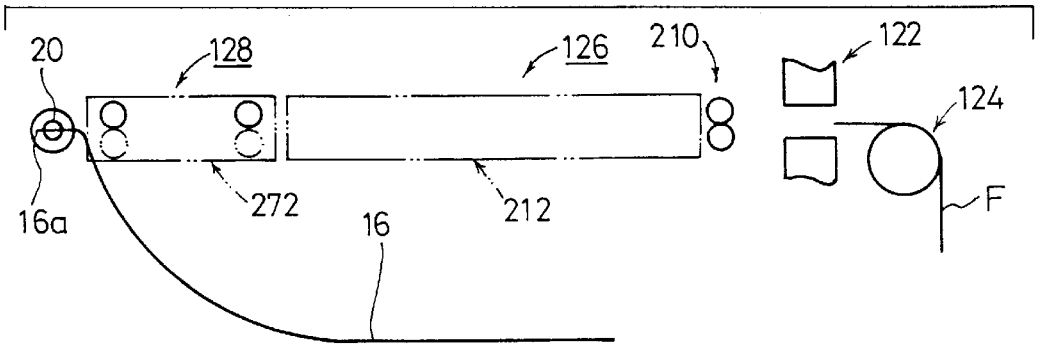
FIG. 20D is a side elevational view showing the manner in which the sized film is released in the short film mode.

Specifically, as shown in FIG. 11, the swing link 256 is angularly moved at a given time by the second cam follower 242b and the second cam 244b of the cam switching unit 214, imparting rotation from the links 260 to the rotatable shafts 226a, 226b. Upon rotation of the rotatable shafts 226a, 226b, the guide members 230a, 230b are angularly moved away from each other, releasing the sized film 16 from the guide grooves 232a, 232b, as shown in FIG. 20D In the insertion guide 272, as shown in FIG. 14, the support shafts 276a, 276b are rotated to turn the guide plates 278a, 278b with the first and second pinch rollers 268, 270 away from each other, releasing the sized film 16, as indicated by the solid lines and the two-dot-and-dash lines.

In the short film mode, if the number of exposures ranges from 9 to 10, the cutting mechanism 122 is operated by the second cam assembly 152, and the film guide 212 is operated by the first cam 244a and the first cam follower 242a as in the normal mode. The table shown below indicates the relationship between the various numbers of exposures of sized films 16 and corresponding cam and cam follower combinations of the cutting mechanism 122 and the film guide 212.

| Number of exposures | Cutting mechanism 122 | | Film guide 212 | |
| --- | --- | --- | --- | --- |
| | Cam | Cam follower | Cam | Cam follower |
| 12–27 | 156 | 160 | 244a | 242a |
| 9–10 | 158 | 162 | 244a | 242a |
| 5–8 | 158 | 162 | 244b | 242b |

According to this embodiment, if the predetermined length of a sized film 16 is larger than the feed distance H from the cutting position in the cutting mechanism 122 to the inserting position in the film coiling unit 22, then the normal mode is selected, and the cutting mechanism 122 is actuated by the first cam assembly 150. After the elongate film F is fed the predetermined length by the first feed mechanism 124, the second feed mechanism 126, and the inserting mechanism 128 until the leading end of the elongate film F is inserted into the groove 20a in the spool 20, the cutting mechanism 122 is operated to cut off the elongate film F by the first cam assembly 150.

If the predetermined length of a sized film 16 is smaller than the feed distance H, then the short film mode is selected, and the cam switching mechanism 130 switches from the first cam assembly 150 to the second cam assembly 152. After the elongate film F is fed the predetermined length, the cutting mechanism 122 is operated to cut off the elongate film F into a short sized film 16 by the second cam assembly 152. The short sized film 16 has its leading end 16a inserted into the groove 20a in the spool 20 by the second feed mechanism 126 and the inserting mechanism 128.

The different sequences of operation of the cutting mechanism 122 in the normal and short film modes can simply be selected by the switching mechanism 130 which switches selectively between the first cam assembly 150 and the second cam assembly 152. The timing of operation of the cutting mechanism 122 can thus be changed easily and accurately. It is therefore possible under simple control to produce sized films 16 of different lengths ranging from a small length equivalent to 10 or less exposures to a large length equivalent to 12 or more exposures, and wind the sized films 16 around respective spools 20 automatically and smoothly.

In this embodiment, furthermore, the timing of operation of the film guide 212 of the second feed mechanism 126 can be selected depending on the length of a sized film 16 by the cam switching unit 214. The film guide 212 can thus be operated to guide sized films 16 of different lengths smoothly with a simple arrangement, so that the sized films 16 can be wound around respective spools 20 efficiently.

Moreover, each of the first and second pinch rollers 268, 270 mounted on the guide plates 278a, 278b is split into two roller segments mounted respectively on guide plates 278a, 278b. When the guide plates 278a, 278b are turned away from each other, the roller segments of the first and second pinch rollers 268, 270 are also turned in unison with the guide plates 278a, 278b. Therefore, the elongate film F or the sized film 16 can reliably be released from the insertion guide 272 by a simple arrangement.

According to the present invention, as described above, the film cutting and inserting device is operated selectively by the first and second cam assemblies depending on the predetermined length of a sized film for easily changing its operation to cut off a photographic photosensitive film and insert a leading end thereof into a spool. The selective operation of the film cutting and inserting device allows different sized films of various lengths to be produced with a relatively simple arrangement.

Furthermore, the diameter of a film roll and the distance that a photographic photosensitive film unreeled from the film roll is fed while the unreeling shaft on which the film roll is mounted makes one revolution are detected, and the rotational speed of the unreeling shaft is controlled on the basis of the detected diameter and distance. Therefore, even if the diameter of the film roll mounted on the unreeling shaft varies, the photographic photosensitive film can smoothly be unreeled from the film roll and fed to a next process.

Although a certain preferred embodiment of the present invention has been shown and described in detail, it should be understood that various changes and modifications may be made therein without departing from the scope of the appended claims.

What is claimed is:

1. A method of processing an elongate photographic photosensitive film by cutting said elongate photographic photosensitive film to any one of a variety of predetermined lengths and inserting an end of said elongate photographic photosensitive film into a spool, comprising the steps of:

when said any one of said predetermined lengths is longer than a feed distance from a cutting position in which said elongate photographic photosensitive film is cut to an inserting position in which said end of said elongate photographic photosensitive film is inserted into said spool, actuating a cutting mechanism with a first cam assembly to insert said end of said elongate photographic photosensitive film into said spool, and thereafter cutting said elongate photographic photosensitive film to said any one of said predetermined lengths; and when said any one of said predetermined lengths is shorter than said feed distance, actuating a cutting mechanism with a second cam assembly to feed said elongate photographic photosensitive film by said any one of said predetermined lengths, thereafter cutting said elongate photographic photosensitive film, and inserting said end of the cut elongate photographic photosensitive film cut into said spool.

2. A method of processing an elongate photographic photosensitive film by rotating an unreeling shaft with a film roll mounted thereon to unreel said elongate photographic photosensitive film from said film roll, comprising the steps of:

detecting a diameter of said film roll;

detecting a distance by which said elongate photographic photosensitive film travels while said unreeling shaft makes one revolution; and controlling a rotational speed of said unreeling shaft based on the detected diameter and the detected distance.

3. A method according to claim 2, further comprising the steps of:

calculating a circumferential length of said film roll by detecting a distance by which said elongate photographic photosensitive film with perforations defined therein travels while said unreeling shaft makes one revolution; and controlling a rotational speed of said unreeling shaft based on the calculated circumferential length.

4. A method according to claim 2, further comprising the steps of:

detecting a looped state of said elongate photographic photosensitive film between said unreeling shaft and a perforating position in which said elongate photographic photosensitive film is perforated; and controlling a rotational speed of said unreeling shaft based on the detected looped state.

5. An apparatus for processing an elongate photographic photosensitive film by cutting said elongate photographic photosensitive film to any one of a variety of predetermined lengths and inserting an end of said elongate photographic photosensitive film into a spool, comprising:

a cutting mechanism for cutting said elongate photographic photosensitive film into a sized film;

a first feed mechanism for feeding said elongate photographic photosensitive film by said any one of said predetermined lengths toward said cutting mechanism;

a second feed mechanism disposed downstream of said cutting mechanism with respect to a direction in which said elongate photographic photosensitive film is fed for feeding a leading end of said elongate photographic photosensitive film toward said spool;

an inserting mechanism disposed near said spool for inserting said leading end of said elongate photographic photosensitive film or said sized film into said spool; and a cam switching mechanism for changing timing of operation of said cutting mechanism depending on said any one of said predetermined lengths.

6. An apparatus according to claim 5, wherein said cam switching mechanism comprises:

first and second cam means selectively coupled to said cutting mechanism for changing said timing of operation of said cutting mechanism;

said first and second cam means comprising:

respective first and second cams juxtaposed with respect to each other and actuatable to rotate about their own axes; and respective first and second cam followers selectively engageable with and disengageable from said first and second cams, respectively;

said cam switching mechanism comprising switching means for displacing said first and second cam followers into selective engagement with said first and second cams, respectively.

7. An apparatus according to claim 5, wherein said second feed mechanism comprises:

a nip roller assembly for gripping and feeding said elongate photographic photosensitive film;

an openable and closable film guide disposed between said nip roller assembly and said inserting mechanism; and cam switching means for changing timing of operation of said openable and closable film guide depending on said any one of said predetermined lengths.

8. An apparatus according to claim 7, wherein said cam switching means comprises:

first and second cams juxtaposed with respect to each other and actuatable to rotate about their own axes;

first and second cam followers selectively engageable with and disengageable from said first and second cams, respectively; and switching means for displacing said first and second cam followers into selective engagement with said first and second cams, respectively.

9. An apparatus according to claim 5, wherein said inserting mechanism comprises:

a rotary actuator;

first and second inserting rollers rotatable in synchronism with each other by said rotary actuator;

first and second pinch rollers rollingly engageable with said first and second inserting rollers, respectively; and an openable and closable insertion guide for guiding said elongate photographic photosensitive film, said first and second pinch rollers being mounted on said openable and closable insertion guide.

10. An apparatus for processing an elongate photographic photosensitive film by rotating an unreeling shaft with a film roll mounted thereon to unreel said elongate photographic photosensitive film from said film roll, comprising:

a diameter detecting mechanism for detecting a diameter of said film roll;

a revolution detecting mechanism for detecting when said unreeling shaft with said film roll mounted thereon has made one revolution;

a feed distance detecting mechanism for detecting a distance by which said elongate photographic photosensitive film is fed; and a control mechanism for controlling a rotational speed of said unreeling shaft based on the detected diameter, the detected revolution, and the detected distance.

11. An apparatus according to claim 10, wherein said diameter detecting mechanism comprises an ultrasonic sensor associated with said film roll.

12. An apparatus according to claim 10, wherein said revolution detecting mechanism has an encoder associated with said unreeling shaft.

13. An apparatus according to claim 10, wherein said feed distance detecting mechanism comprises:

a perforation motor for perforating said elongate photographic photosensitive film; and a encoder coupled to said perforation motor.

14. An apparatus according to claim 10, further comprising a loop position detecting mechanism for detecting a looped state of said elongate photographic photosensitive film between said unreeling shaft and a perforating position in which said elongate photographic photosensitive film is perforated.

15. An apparatus according to claim 14, wherein said loop position detecting mechanism comprises:

first and second infrared sensors vertically spaced from each other for detecting upper and lower limit positions of said elongate photographic photosensitive film.

* * * * *